United States Patent
Kaufman et al.

(10) Patent No.: US 11,105,685 B2
(45) Date of Patent: *Aug. 31, 2021

(54) PASSIVE DETECTORS FOR IMAGING SYSTEMS

(71) Applicant: DIGITAL DIRECT IR, INC., Fresh Meadows, NY (US)

(72) Inventors: Peter N. Kaufman, Fresh Meadows, NY (US); Howard E. Carpenter, Carmel, NY (US)

(73) Assignee: DIGITAL DIRECT IR, INC., Fresh Meadows, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/372,322

(22) Filed: Apr. 1, 2019

(65) Prior Publication Data

US 2020/0096392 A1 Mar. 26, 2020

Related U.S. Application Data

(63) Continuation of application No. 15/383,779, filed on Dec. 19, 2016, now Pat. No. 10,247,614, which is a continuation of application No. 14/677,954, filed on Apr. 2, 2015, now Pat. No. 9,523,612, which is a (Continued)

(51) Int. Cl.
| | | |
|---|---|---|
| *G01J 5/40* | (2006.01) | |
| *G01J 5/04* | (2006.01) | |
| *G01J 5/02* | (2006.01) | |
| *G01J 5/34* | (2006.01) | |
| *G01J 5/44* | (2006.01) | |
| *G01J 5/08* | (2006.01) | |
| *G01J 1/44* | (2006.01) | |
| *G01J 5/06* | (2006.01) | |
| *G01J 5/10* | (2006.01) | |
| *G01J 5/00* | (2006.01) | |

(52) U.S. Cl.
CPC . *G01J 5/40* (2013.01); *G01J 1/44* (2013.01); *G01J 5/023* (2013.01); *G01J 5/0225* (2013.01); *G01J 5/046* (2013.01); *G01J 5/06* (2013.01); *G01J 5/0806* (2013.01); *G01J 5/10* (2013.01); *G01J 5/34* (2013.01); *G01J 5/44* (2013.01); *G01J 2005/0077* (2013.01); *G01J 2005/065* (2013.01)

(58) Field of Classification Search
CPC ........ G01J 5/40; G01J 5/10; G01J 5/06; G01J 5/023; G01J 5/0225; G01J 5/046; G01J 1/44; G01J 5/0806; G01J 5/44; G01J 5/34; G01J 2005/065; G01J 2005/0077
USPC .......................................................... 250/340
See application file for complete search history.

(56) References Cited

U.S. PATENT DOCUMENTS

| 9,012,845 B2 * | 4/2015 | Kaufman | G01J 1/44 250/338.1 |
| 2007/0108383 A1 * | 5/2007 | Combes | G01J 5/44 250/338.1 |

(Continued)

*Primary Examiner* — David P Porta
*Assistant Examiner* — Gisselle M Gutierrez

(57) ABSTRACT

Passive detector structures for imaging systems are provided which implement unpowered, passive front-end detector structures with direct-to-digital measurement data output for detecting incident photonic radiation in various portions (e.g., thermal (IR), near IR, UV and visible light) of the electromagnetic spectrum.

19 Claims, 19 Drawing Sheets

Related U.S. Application Data continuation of application No. 13/588,441, filed on Aug. 17, 2012, now Pat. No. 9,012,845.

(60) Provisional application No. 61/524,669, filed on Aug. 17, 2011.

(56) References Cited

U.S. PATENT DOCUMENTS

| | | | |
|---|---|---|---|
| 2015/0057548 A1* | 2/2015 | Kaufman | A61B 1/0638 600/473 |
| 2016/0047693 A1* | 2/2016 | Kaufman | G01J 5/10 250/340 |
| 2017/0023406 A1* | 1/2017 | Kaufman | G01J 1/44 |
| 2017/0023414 A1* | 1/2017 | Kaufman | G01J 5/20 |
| 2017/0026589 A1* | 1/2017 | Kaufman | G01J 3/0208 |
| 2017/0248471 A1* | 8/2017 | Kaufman | G01J 5/0205 |
| 2017/0343420 A1* | 11/2017 | Kaufman | G01J 5/023 |
| 2018/0125342 A1* | 5/2018 | Kaufman | G01J 5/0215 |
| 2019/0137344 A1* | 5/2019 | Kaufman | G01J 5/0205 |
| 2019/0383665 A1* | 12/2019 | Kaufman | G01J 5/0803 |
| 2020/0096392 A1* | 3/2020 | Kaufman | G01J 5/0225 |

* cited by examiner

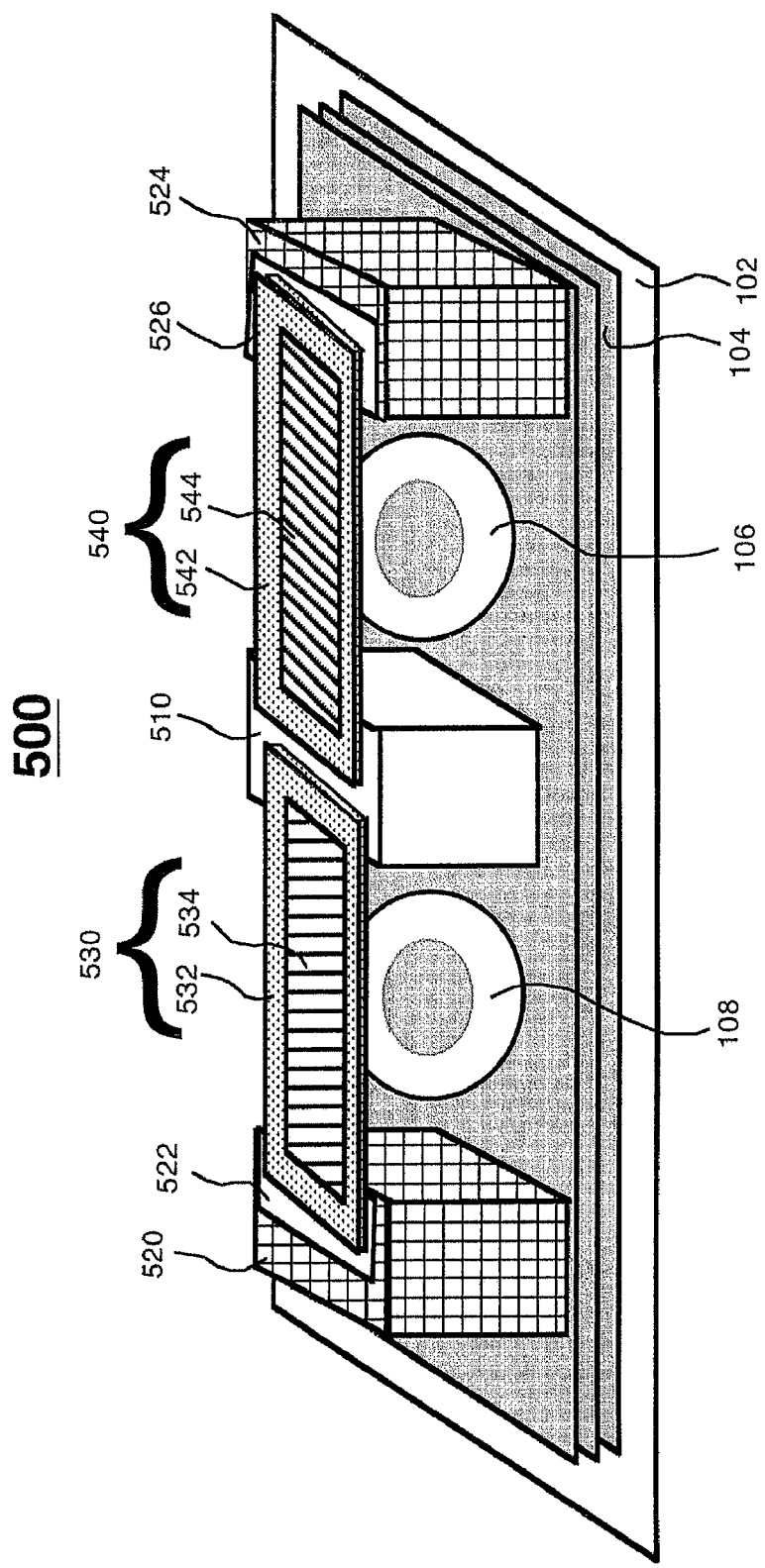

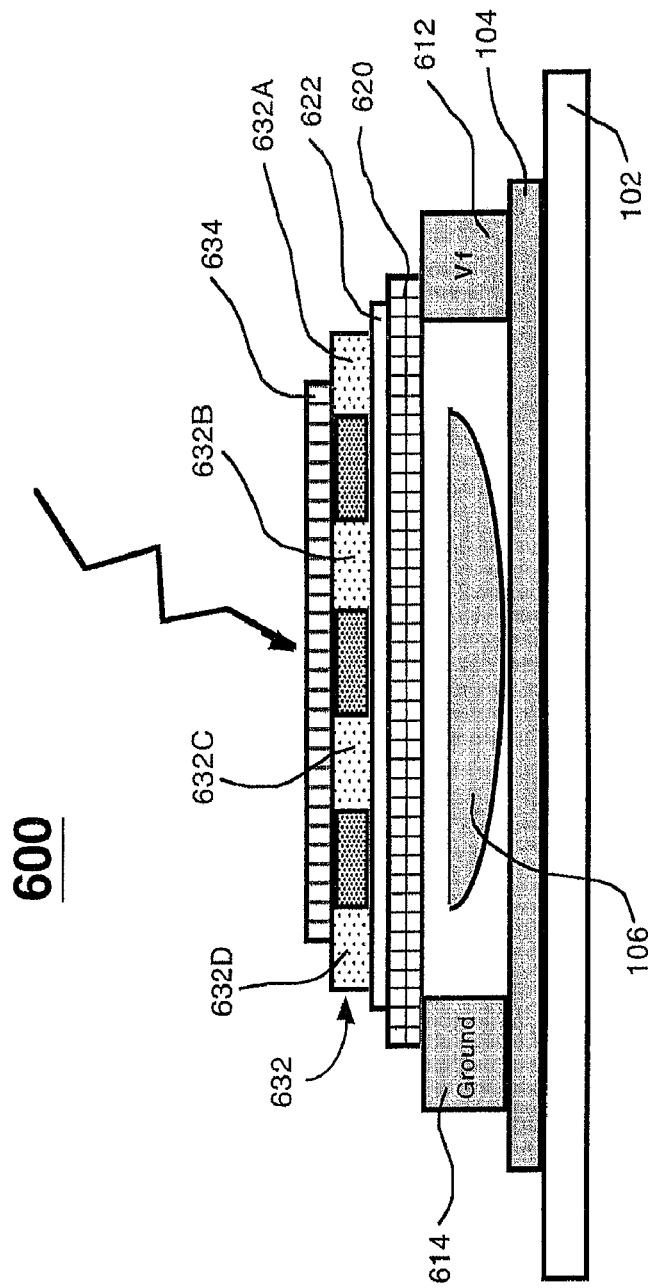

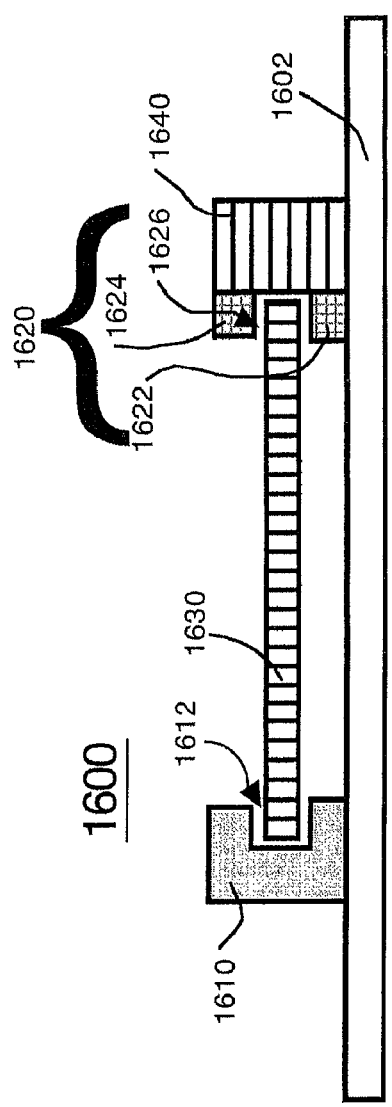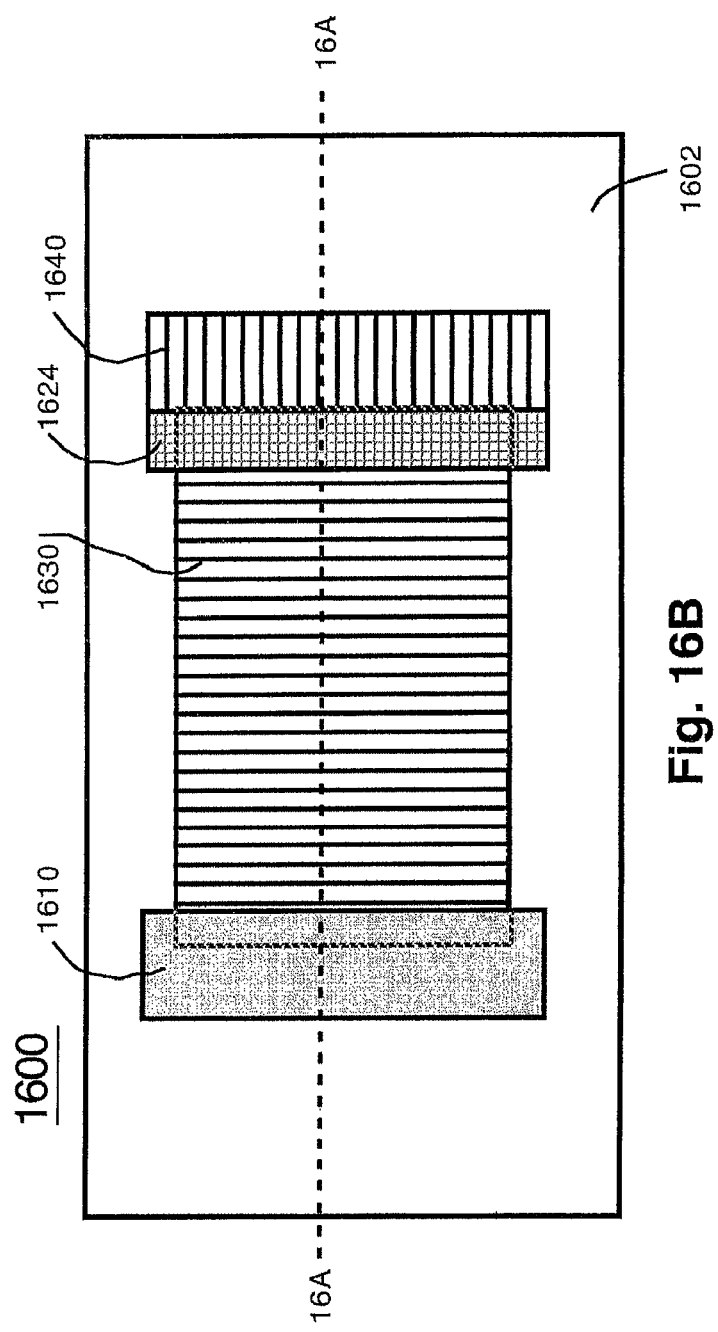
Fig. 16A
Fig. 16B

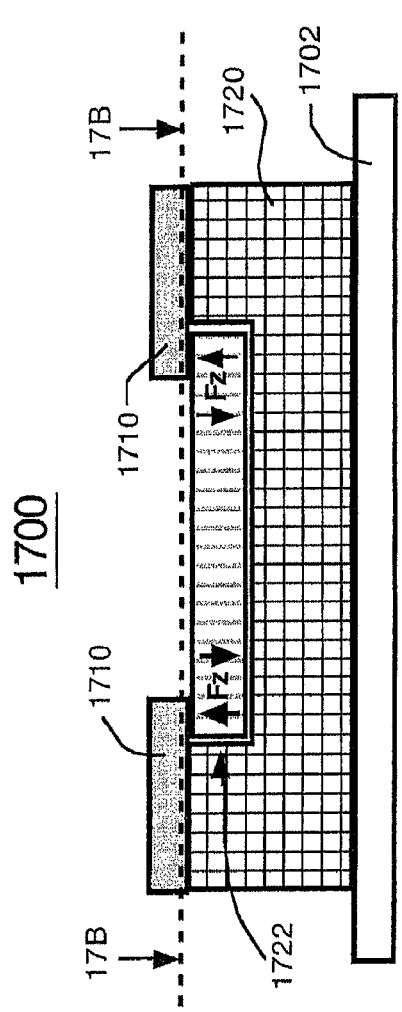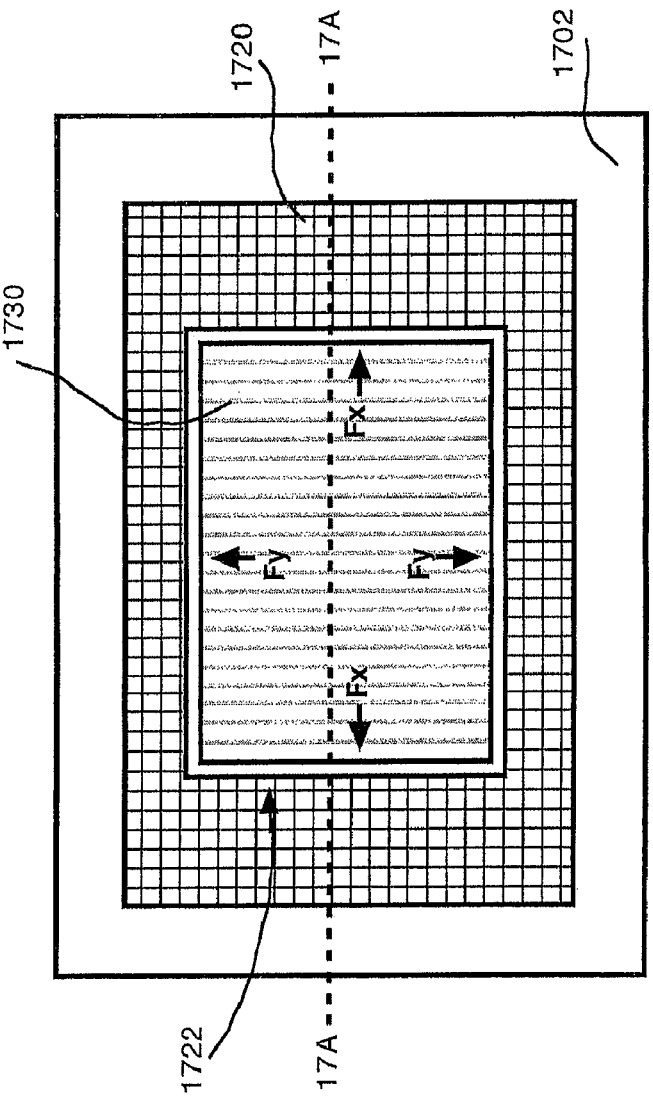
Fig. 17A
Fig. 17B

PASSIVE DETECTORS FOR IMAGING SYSTEMS

CROSS-REFERENCE TO RELATED APPLICATIONS

This application is a Continuation of U.S. patent application Ser. No. 15/383,779, filed on Dec. 19, 2016, now U.S. Pat. No. 10,247,614, which is a Continuation of U.S. patent application Ser. No. 14/677,954, filed on Apr. 2, 2015, now U.S. Pat. No. 9,523,612, which is a Continuation of U.S. patent application Ser. No. 13/588,441, filed on Aug. 17, 2012, now U.S. Pat. No. 9,012,845, which claims priority to U.S. Provisional Patent Application Ser. No. 61/524,669, filed on Aug. 17, 2011, the disclosures of which are incorporated herein by reference.

TECHNICAL FIELD

The field generally relates to detector structures for imaging systems and, in particular, to passive front-end detector structures with direct-to-digital measurement data output for detecting incident photonic radiation in various portions (e.g., thermal (IR), near IR, UV and visible light) of the electromagnetic spectrum.

BACKGROUND

In general, MEMS technology has been utilized to construct infrared light detectors. One such light (IR photonic) detector includes a MEMS structure with a capacitor and a cantilever arm. The capacitor has a fixed plate and a mobile plate. The cantilever arm has a first end, which is fixed to a substrate, and a second end, which is fixed to the mobile capacitor plate. The cantilever arm also includes a bimorph portion that bends in response to being heated by absorption of infrared light. Bending of the bimorph portion displaces the mobile plate in a manner that changes the distance between the mobile and fixed plates of the absorber. Thus, illumination of the MEMS structure by infrared light produces a measurable change in an electrical property of the structure, i.e., the capacitance of the capacitor. By measuring variations in such capacitances, the light detector is able to determine the intensity of infrared light illuminating each MEMS structure, i.e., each pixel element of the detector.

Another common type of thermal radiation detector is the un-cooled micro-bolometer. In general, a micro-bolometer comprises a thin film absorbing detector and a thermal isolation structure. Incident radiation absorbed by the detector induces a temperature increase that further result in variations of the electric conductivity of the thin film detector. The electrical conductivity is used to determine the intensity of the incident radiation.

The principal limitations of detectors including cantilever and micro-bolometer type structures arises from the electrical connections required to read the temperature variations or changes in electrical characteristics (e.g., resistance, capacitance) induced by incident radiation. Moreover, the complexity of manufacturing pixel interconnections and the readout circuitry has maintained the manufacturing costs of the detector structures prohibitive for many applications. Furthermore, these electrical interconnections impair the thermal isolation between the pixels and the readout system and, as a result, limit the thermal sensitivity of the detector. Semiconductor and quantum electronic detector methodologies are very prone to self-generated and external noise sources that lower the systems sensitivity and require complex and expensive methods to mitigate the problems.

SUMMARY

Exemplary embodiments of the invention include passive detector structures for imaging systems and, in particular, to unpowered, passive front-end detector structures with direct-to-digital measurement data output for detecting incident photonic radiation in various portions (e.g., thermal (IR), near IR, UV and visible light) of the electromagnetic spectrum.

For example, in one exemplary embodiment of the invention, a photon detector device includes a substrate, a resonator member, a passive detector structure, and a digital circuit. The resonator member is disposed on the substrate and outputs a signal having an oscillating frequency. The passive detector structure is disposed on the substrate and is mechanically coupled to the resonator member. The passive detector structure includes a detector member that is mechanically distorted in response to photon exposure to apply a mechanical force to the resonator member and change the oscillating frequency of the resonator member in response to the mechanical force. In some embodiments, the detector member is formed of one or more materials having a thermal coefficient of expansion that causes the detector member to become mechanically distorted by thermal expansion and contraction. The digital circuit is coupled to the resonator member. The digital circuit operates by, e.g., determining the oscillating frequency of the resonator member, which changes due to the mechanical force exerted on the resonator member by the passive detector structure, and determining an amount of incident photonic energy absorbed by the detector member based on the determined oscillating frequency of the resonator member.

In another exemplary embodiment, a method for detecting photonic energy includes exposing a passive detector member to incident photonic energy to cause the detector member to be mechanically distorted in response to photon exposure, applying a mechanical force to a resonator member in response to mechanical distortion of the passive detector member, determining an oscillating frequency of the resonator member, which changes due to the mechanical force exerted on the resonator member by the passive detector member, and determining an amount of incident photonic energy absorbed by the detector member based on the determined oscillating frequency of the resonator member. In other embodiments, the method further includes generating image data using the determined oscillating frequency. The amount of incident photonic energy absorbed by said detector member may be determined by generating count data by counting a number of digital pulses in an output signal of the resonator member for a given counting period, and determining a level of photonic exposure of the detector member based on the count data.

These and other exemplary embodiments of the present invention will become apparent from the following detailed description of illustrative embodiments thereof, which is to be read in connection with the accompanying drawings.

BRIEF DESCRIPTION OF THE DRAWINGS

FIG. 5 is a perspective view of a photon detector according to another exemplary embodiment of the invention, which is based on a CTE framework.

FIGS. 6A and 6B illustrate a photon detector according to another exemplary embodiment of the invention, which is based on a CTE framework, wherein FIG. 6A is a top perspective view of the photon detector and wherein FIG. 6B is a side view of the photon detector taken along line 6B-6B in FIG. 6A.

FIGS. 15A and 15B illustrate a photon detector according to another exemplary embodiment of the invention, which is based on a CTE framework, wherein FIG. 15A is a top view of the photon detector and wherein FIG. 15B is a cross-sectional view of the photon detector taken along line 15B-15B in FIG. 15A.

FIGS. 16A and 16B illustrate a photon detector according to another exemplary embodiment of the invention, which is based on a CTE framework, wherein FIG. 16A is a cross-sectional view of the photon detector taken along line 16A-16A in FIG. 16B, and wherein FIG. 16B is a top view of the photon detector.

FIGS. 17A and 17B illustrate a photon detector according to another exemplary embodiment of the invention, which is based on a CTE framework, wherein FIG. 17A is a cross-sectional view of the photon detector taken along line 17A-17A in FIG. 17B, and wherein FIG. 17B is a top view of the photon detector taken along line 17B-17B in FIG. 17A.

DETAILED DESCRIPTION OF EXEMPLARY EMBODIMENTS

Figure 1:
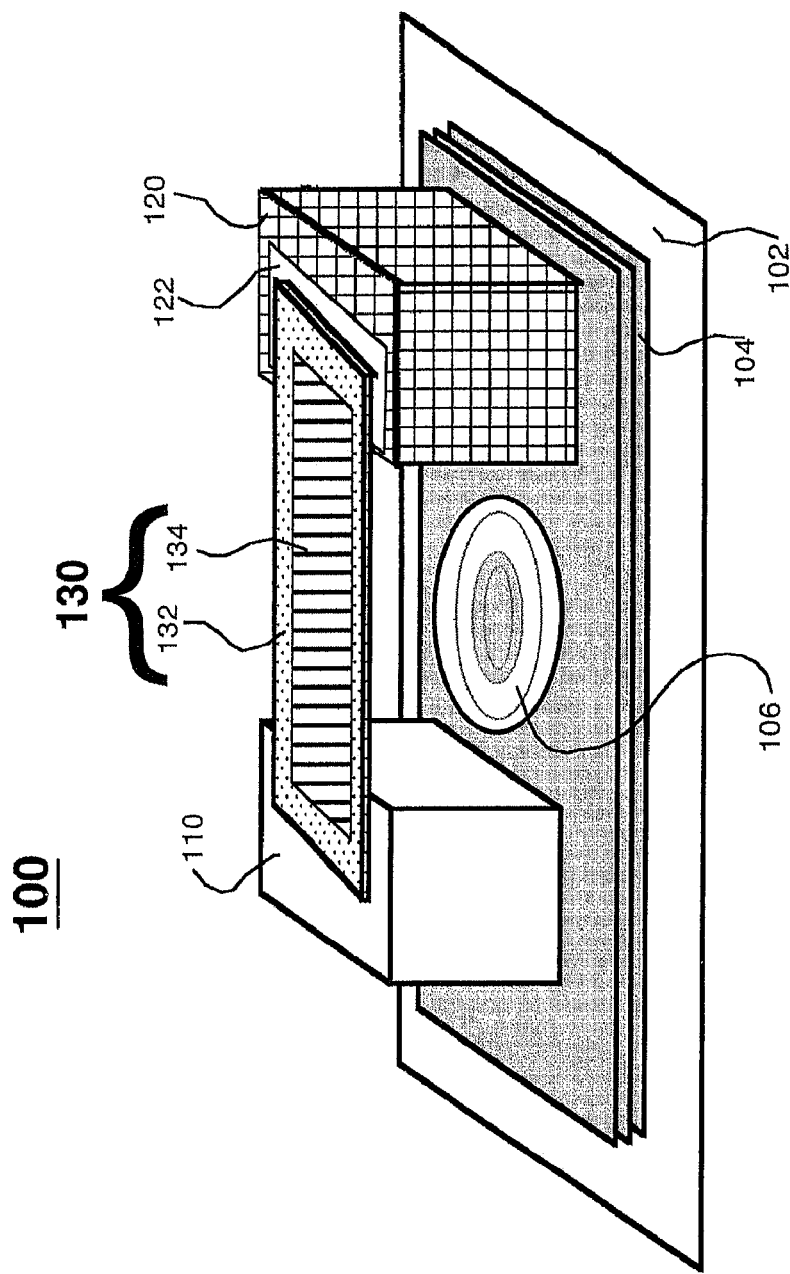
FIG. 1 is a perspective view of a photon detector according to an exemplary embodiment of the invention, which is based on a coefficient of thermal expansion (CTE) framework.

Exemplary embodiments of the invention will now be described in further detail below with regard to passive detector structures for imaging systems and, in particular, to unpowered, passive front-end detector structures with direct-to-digital measurement data output for detecting incident photonic radiation in various portions (e.g., thermal (IR), near IR, UV and visible light) of the electromagnetic spectrum. Exemplary passive detector frameworks described herein provide a new paradigm for detecting incident photonic energy in the electromagnetic spectrum (e.g. infrared, visible, and ultraviolet spectrums), as well as electromagnetic radiation in the microwave, teraherz and x-ray portions of the electromagnetic spectrum. The passive detector frameworks implement a direct-to-digital measurement with no analog front end or quantum semiconductors, thereby providing a low noise, low power, low cost and ease of manufacture detector design, as compared to conventional CMOS or CCD detector devices. The exemplary passive detector frameworks with direct-to-digital measurement data output as described herein do not use any quantum photonic or electron conversion techniques, and have none of the technological, manufacturing or noise problems associated with conventional imager technologies as discussed above.

As discussed in further detail below, exemplary embodiments of the invention are based on various passive detector methodologies to detect various wavelengths of UV, visible, near IR, Mid IR and Far IR and Terahertz radiation. The exemplary passive detector paradigms described herein include CTE (coefficient of thermal expansion), PICE (photon induced coefficient of expansion), and VID (voltage induced distortion) detector frameworks. In general, these detector frameworks implement a passive detector structure comprising a detector member that is mechanically distorted in response to photon or electromagnetic radiation exposure to apply a mechanical force to a resonator member and change the oscillating frequency of the resonator member in response to the mechanical force. A digital circuit is coupled to the resonator member and operates to determine the oscillating frequency of the resonator member, which changes due to the mechanical force exerted on the resonator member by the passive detector structure, and to determine an amount of incident photonic energy or electromagnetic radiation exposure of the detector member based on the determined oscillating frequency of the resonator member.

With a CTE framework, a passive detector member (e.g., ribbon(s) or plate(s)) is made of one or more materials having a thermal coefficient of expansion, wherein the detector member expands and contracts in response to incident photonic energy to exert a mechanical force on a resonator member and vary the oscillating frequency of the resonator member.

With a PICE framework, a passive detector member is made of one or more materials that change their shape and size when exposed to specific wavelengths of electromagnetic radiation. The detector member is mechanically deformed (e.g., expands and contracts) in response to exposure of incident electromagnetic radiation to exert a mechanical force on a resonator member and vary the oscillating frequency of the resonator member.

With a VID framework, for wavelengths such as X-rays (1 nm) through Near IR (30), a detector member can be formed of one or more materials, which generates a voltage in response to exposure of incident radiation. The generated voltage is applied to resonator member (e.g., a piezo material layer), causing the resonator member to mechanically distort and change the oscillating frequency of the resonator member. For example, a voltage can be generated from photonic exposure of a detector member formed of a photovoltaic (PV) material. In addition, for thermal IR wavelengths (3 to 14μ), a detector member can be formed of a pyroelectric material to generate a voltage that can be applied to distort a piezo resonator member and change the oscillating frequency of the resonator member.

FIGS. 1-6 are perspective views of various passive detector frameworks according to exemplary embodiments of the invention, which are based on a CTE framework. For example, FIG. 1 is a perspective view of a photon detector according to an exemplary embodiment of the invention. In general, the photon detector (100) comprises a substrate (102), digital logic circuitry (104), a parabolic mirror (106), and a bridge structure formed on the substrate (102). The bridge structure includes a first support member (110), a second support member (120) and a detector member (130) suspended between the support members (110) and (120) above the substrate (102). The second support member (120) is a resonator member that operates at a resonant frequency and the first support member (110) is a fixed insulating support structure. The detector member (130) (or ribbon) comprises a bi-metal ribbon (132) having a thermal coefficient of expansion, which expands and contracts by absorption of incident infrared energy to exert force on the resonator member (120), and a photon energy absorbing layer (134). An insulating material layer (122) is disposed between the end of the ribbon (130) and the resonator member (120) to provide thermal isolation between the ribbon (130) and the resonator support structure (120). The digital logic circuit (104) is coupled to the resonator member (120) for determining a change in oscillating frequency of the resonator member (120) due to force exerted on the resonator member (120) by the thermal expansion and contraction of the ribbon structure (130), wherein the change in frequency is correlated to an amount of incident infrared energy absorbed by the ribbon structure (130).

More specifically, the ribbon (130) is made of materials that are sensitive to IR heat causing the ribbon (130) to expand and contract based on the absolute amount of incident IR photons striking the ribbon (130). The metallic materials forming the bi-metal ribbon layer (132) may be formed with any suitable materials having a negative and/or positive coefficient of thermal expansion. The photon energy absorbing layer (134) may be formed of any suitable material (such as carbon, SiC, etc.) having a peak sensitivity at any desired IR wavelength in the IR spectrum from 1 micron to 30 microns. In other exemplary embodiments, filter materials can be deposited on top of the photon energy absorbing layer (134) to make the sensitivity narrower. A narrow response may be achieved by doping the photon energy absorbing material layer (134) with spectral material that either reflects or negates the response in undesirable portions of the IR spectrum.

As shown in FIG. 1, the ribbon (130) is suspended like a bridge between the supports (110) and (120) leaving the area under the ribbon (130) open, unsupported and not in contact with any parts of the rest of the pixel structure. Only the end portions of the ribbon (130) are attached to any portion of the pixel structure (100). This design allows the ribbon (130) to have the least possible mass such that with a low mass, the ribbon (130) can heat soak from the incident IR photon exposure in the shortest amount of time. This will make the sensor react as fast as possible. A fast reaction time will allow faster imaging. The parabolic reflector (106) can be placed under the ribbon (130) on the substrate (102) to increase the pixels fill-factor allowing more IR photons to strike and affect the ribbon from the top and bottom. Fill-factor is the total amount of surface area of the pixel that is capable of collecting the incoming incident photons. The pixel has a finite dimension and finite area. The higher the percentage of fill-factor the more of the pixels area is used to collect photons. The higher the fill-factor percentage, the better the pixels sensitivity, and performance. The mirror 106 can be parabolic, flat or V shaped, or may not be implemented at all.

Figure 2:
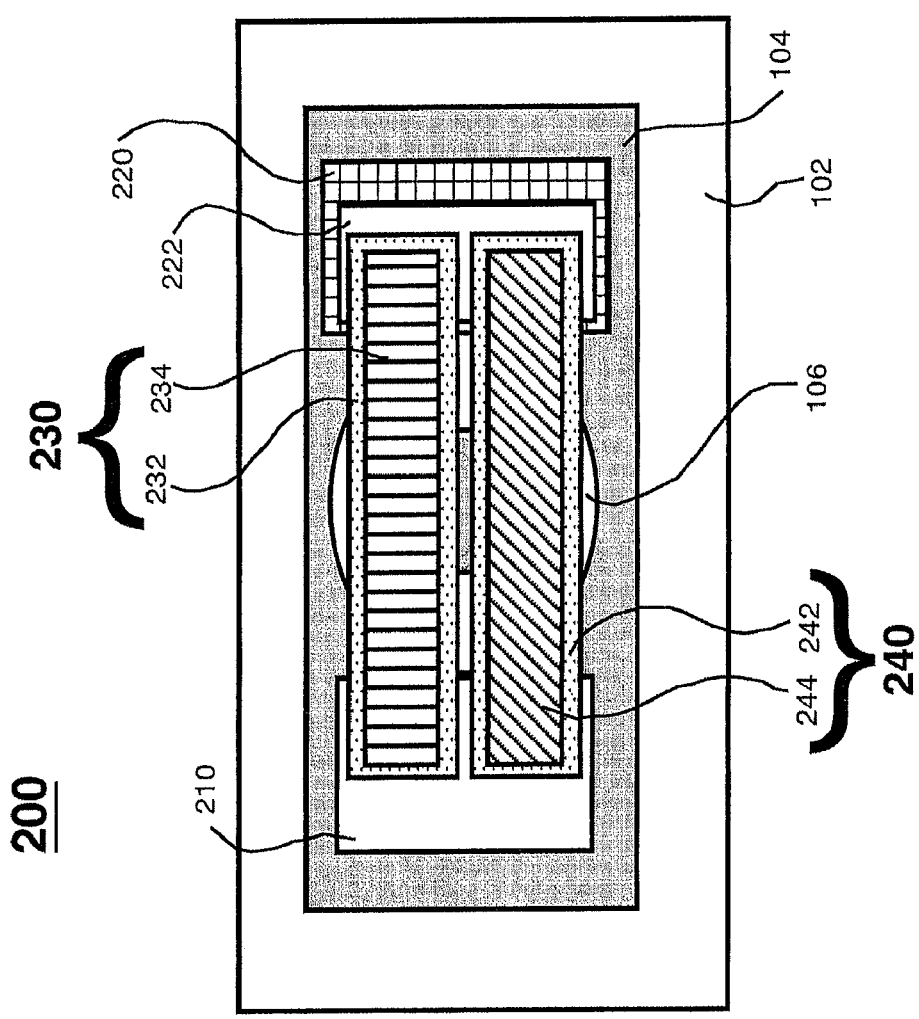
FIG. 2 is a top view of a photon detector according to another exemplary embodiment of the invention, which is based on a CTE framework.

FIG. 2 is a perspective view of a photon detector according to another exemplary embodiment of the invention. In general, FIG. 2 depicts a photon detector (200) that comprises a substrate (102), digital logic circuitry (104), a parabolic mirror (106), and a bridge structure formed on the substrate (102). The bridge structure includes a first support member (210), a second support member (220) and two ribbon members (230) and (240) suspended between the support members (210) and (220) above the substrate (102). The first ribbon (230) comprises a bi-metal layer (232) and a photon energy absorbing layer (234) and the second ribbon (240) comprises a bi-metal layer (242) and a photon energy absorbing layer (244). The second support member (220) is a resonator member that operates at a resonant frequency and the first support member (210) is a fixed insulating support structure. An insulating layer (222) is disposed between the ribbon structures (230) and (240) and the resonator support structure (220) to provide thermal isolation.

The thermal detector (200) is similar to the detector (100) of FIG. 1, except for the inclusion of two ribbon members (230) and (240) which provided added functionality. In particular, in one exemplary embodiment, each ribbon (230) and (240) can be designed with different materials to detect IR radiation with sensitivity at two different portions of the IR spectrum (e.g., 10 microns and 4 microns), so that the detector (200) can provide enhanced sensitivity at more than one wavelength. In another exemplary embodiment, each ribbon (230) and (240) can be designed with similar materials to detect IR radiation with sensitivity in one portion of the IR spectrum but with a wider bandwidth, enabling the linearity of the detector response to be controlled and tailored over a given thermal range of pixel design specifications and parameters.

Figure 3:
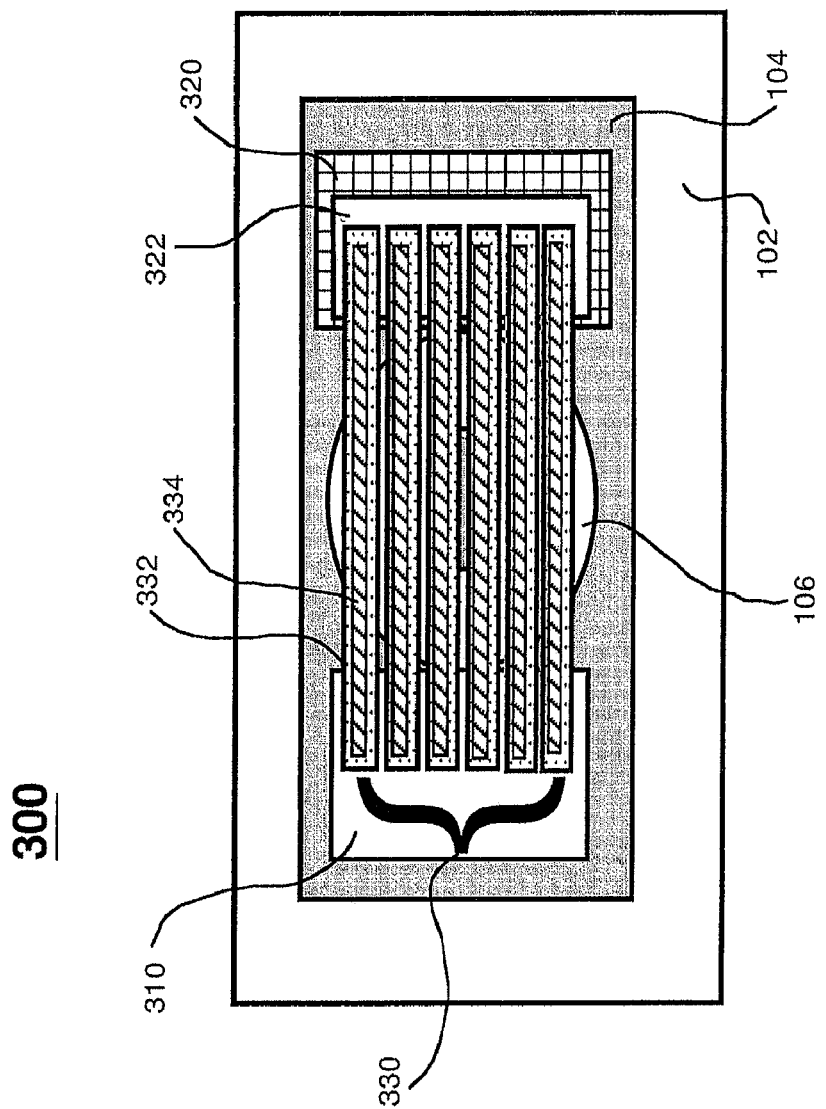
FIG. 3 is a top view of a photon detector according to another exemplary embodiment of the invention, which is based on a CTE framework.

FIG. 3 is a perspective view of a photon detector according to another exemplary embodiment of the invention. In general, FIG. 3 depicts a photon detector (300) that comprises a substrate (102), digital logic circuitry (104), a parabolic mirror (106), and a bridge structure formed on the substrate (102). The bridge structure includes a first support member (310), a second support member (320) and a plurality of ribbon members (330), each ribbon (330) including a bimetal layer (332) and a photon energy absorbing layer (334). The second support member (320) is a resonator member that operates at a resonant frequency and the first support member (310) is a fixed insulating support structure.

An insulating layer (322) is disposed between the ribbon structures (330)) and the resonator support structure (320) to provide thermal isolation.

The thermal detector (300) is similar in operation to the detector (100) discussed above with reference to FIG. 1, for example, except for the inclusion of multiple smaller ribbon structures (330) each similarly designed to operate at a given portion of the IR spectrum. However, the use of multiple ribbons (330) allows each ribbon to have lower mass, as compared to the single ribbon structure of FIG. 1. With lower mass per each individual ribbon (330), each of the ribbons (330) can react to thermal energy (expand and contract) faster, thereby reducing the response time of the pixel.

Figure 4:
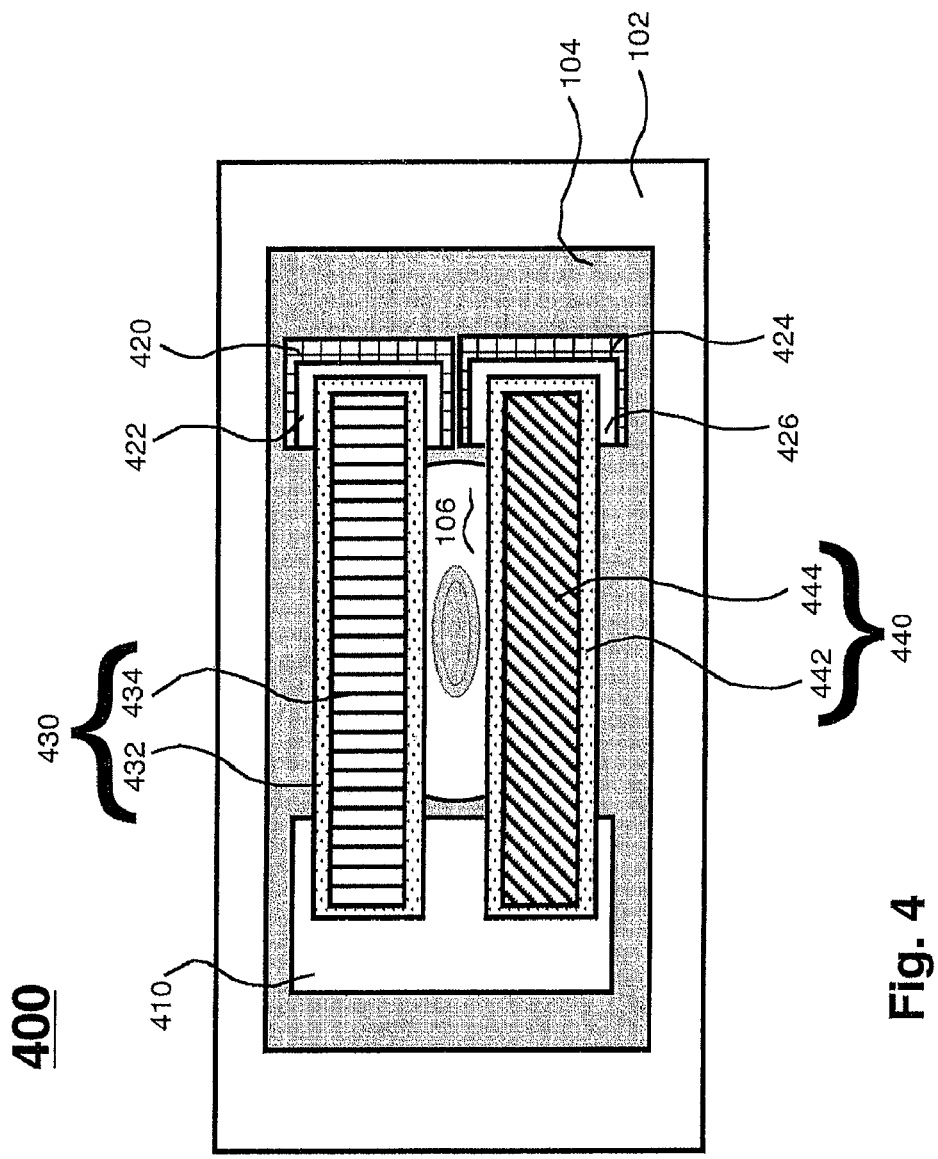
FIG. 4 is a top view of a photon detector according to another exemplary embodiment of the invention, which is based on a CTE framework.

FIG. 4 is a perspective view of a photon detector according to another exemplary embodiment of the invention. In general, FIG. 4 depicts a photon detector (400) that comprises a substrate (102), digital logic circuitry (104), a parabolic mirror (106), and a dual bridge structure formed on the substrate (102). The dual bridge structure includes a first support member (410), a first resonator support member (420), a second resonator support member (424), a first ribbon member (430) connected between the first support member (410) and the first resonator support member (420), and a second ribbon member (440) connected between the first support member (410) and the second resonator support member (424). Each ribbon (430) and (440) includes a respective bimetal layer (432) and (442) and a respective photon energy absorbing layer (434) and (444). Insulating layers (422) and (426) are disposed between the respective ends of ribbon structures (430) and (440), and respective resonator support members (420) and (424).

The thermal detector (400) is similar in operation and design to the detectors (100) and (200) discussed above, for example, except that the detector can operate in two different spectrums independent of each other. This is made possible by use of the separate ribbon structures (430) and (440) and independent resonator support members (420) and (424). In particular, each ribbon (430) and (440) can be designed with different materials to detect IR radiation with sensitivity at two different portions of the IR spectrum (e.g., 10 microns and 4 microns) so the control logic circuitry (104) can be operated to detect IR energy in one or both of the supported spectrums at a given time.

FIG. 5 is a perspective view of a photon detector according to another exemplary embodiment of the invention. In general, FIG. 5 depicts a photon detector (500) that comprises a substrate (102), digital logic circuitry (104), a first and second parabolic mirror (106) and (108), and a bridge structure formed on the substrate (102). The bridge structure includes a first support member (510), a first resonator support member (520), a second resonator support member (524), a first ribbon member (530) connected between the first support member (510) and the first resonator support member (520), and a second ribbon member (540) connected between the first support member (510) and the second resonator support member (424). Each ribbon (530) and (540) includes a respective bimetal layer (532) and (542) and a respective photon energy absorbing layer (534) and (544). Insulating layers (522) and (526) are disposed between the respective ends of ribbon structures (530) and (540), and respective resonator support members (520) and (524).

The thermal detector (500) is similar in operation and design to the detectors (100) discussed above, for example, except that in the framework of FIG. 5, a pair of adjacent pixels are designed to share a single insulating support member (510), as compared to FIG. 1, wherein each pixel includes a separate insulating support member. The framework of FIG. 5 provides a more compact design, which can also be implemented with the detector frameworks depicted in FIGS. 2-4.

Figure 6A:
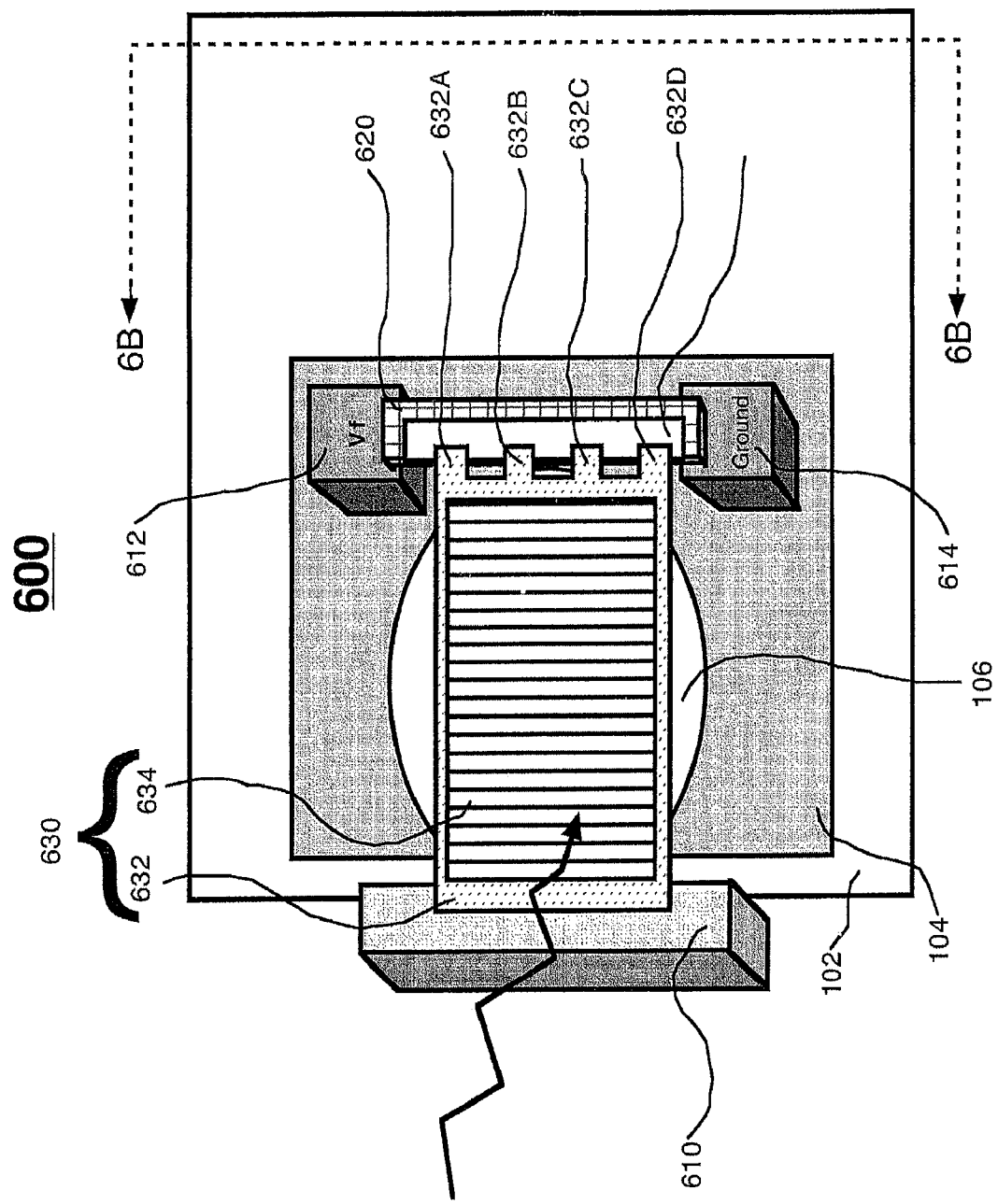

FIGS. 6A and 6B illustrate a photon detector according to another exemplary embodiment of the invention. In general, FIG. 6A is a schematic top perspective view of a photon detector (600) and FIG. 6B is a schematic side view of the photon detector (600) taken along line 6B-6B in FIG. 6A. Referring to FIGS. 6A and 6B, the photon detector (600) comprises a substrate (102), digital logic circuitry (104), a parabolic mirror (106), a bridge structure formed on the substrate (102). The bridge structure includes a first support member (610), a second support member (612), a third support member (614), a resonator member (620), an insulating layer (622), and a ribbon member (630). The resonator member (620) is connected between the second and third support members (612) and (614), wherein the resonator member (620) is suspended above the substrate (102) (which is in contrast to previously discussed embodiments in which the resonator member serves as a support member anchored to the substrate).

The ribbon structure (630) comprise a bimetal layer (632) and a photon energy absorbing layer (634) (e.g., carbon, carbon nanotubes, SiC, etc.). The ribbon structure (630) is connected between the first support member (610) and the resonator member (620). In particular, the ribbon structure (630) comprises a plurality of tabs (632A, 632B, 632C and 632D) which are integrally formed as part of the bimetal layer (632), wherein the ribbon (630) is connected to the resonator member (620) via the tabs (632A, 632B, 632C and 632D). The use of the tabs (632A, 632B, 632C and 632D) and the insulating layer (622) serve to thermally isolate the resonator member (620) from the bimetal layer (632). In the exemplary embodiment of FIGS. 6A and 6B, the second support member (612) provides supply voltage V+ to the resonator member (620) and the third support member (614) provides a ground connection for the resonator member (620).

Figure 7:
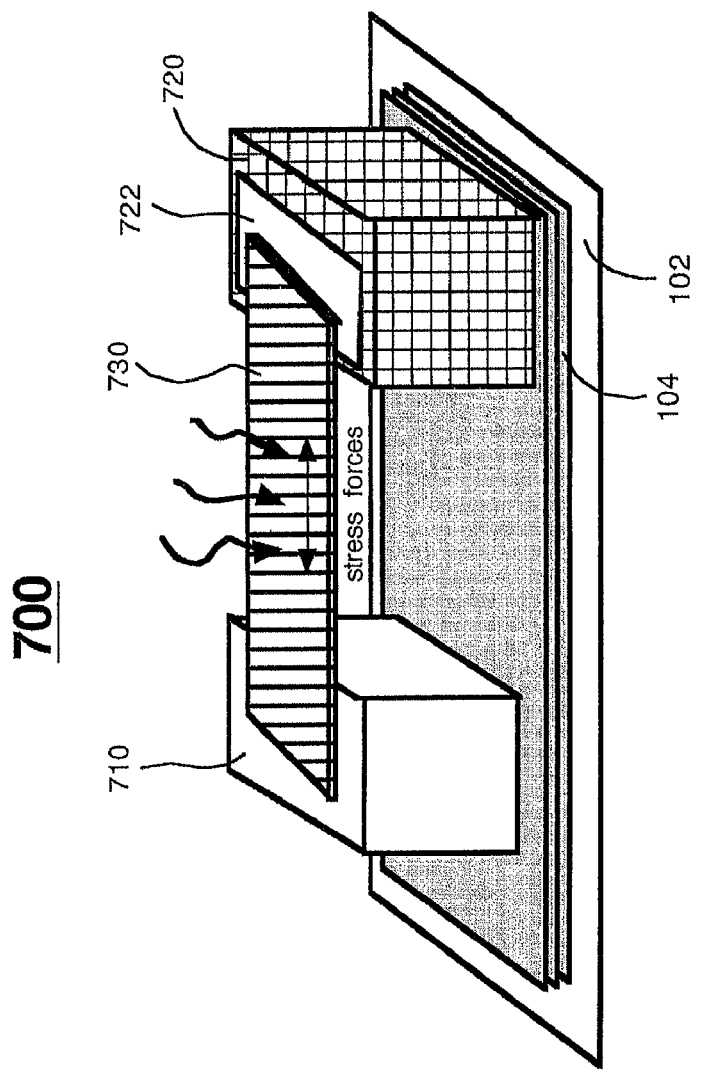
FIG. 7 is a perspective view of a visible light detector according to an exemplary embodiment of the invention, which is based on a photon-induced coefficient of expansion (PICE) concept.

With PICE-based pixel frameworks, materials are used that will distort their shape when exposed to specific wavelengths between X-rays (1 nm) through Near IR (3µ). For example, a CdS structure will change shape when exposed to visible light. FIG. 7 is a perspective view of a visible light detector (700) framework according to an exemplary embodiment of the invention, which is based on the PICE concept. In general, the detector (700) comprises a substrate (102), digital logic circuitry (104), and a bridge structure formed on the substrate (102). The bridge structure includes a first support member (710), a second support member (720) and a ribbon member (730) suspended between the support members (710) and (720) above the substrate (102).

The support member (720) is a resonator member that operates at a resonant frequency and the second support member (710) is a fixed insulating support structure. The ribbon structure (730) is made from a photo-sensitive material (such as CdS, ZnO) having a photon induced coefficient of expansion, which causes mechanical deformation of the ribbon structure (7300 caused directly by photonic exposure. An insulating material layer (722) is disposed between the end of the ribbon (730) and the resonator member (720) to provide thermal and electrical isolation between the ribbon (730) and the resonator support structure (720).

The ribbon structure (730) includes a layer of material (e.g., CdS) which receives incident photons, causing the ribbon (730) to stress and change length. This stress is transferred to the resonator (720), which causes it to change its resonant frequency in proportion to the amount of incident photon exposure. The digital logic circuit (104) is coupled to the resonator member (720) for determining a change in oscillating frequency of the resonator member (720) due to force exerted on the resonator member (720) by the mechanical expansion and contraction of the ribbon structure (730), wherein the change in frequency is correlated to an amount of incident photon energy received by the ribbon structure (730).

FIGS. 8-14 are perspective views of various detector frameworks according to exemplary embodiments of the invention, which are based on the VID concept. These frameworks provide a passive detector architecture for wavelengths, X-rays (1 nm) through Near IR (3μ), wherein a ribbon material produces a voltage from photon exposure, and wherein the voltage is applied to a piezo material layer that will cause the material to distort and create the stress to alter the resonator frequency. In other embodiments, for thermal IR wavelengths, a pyroelectric material may be used to generate a voltage that when applied to a piezo material layer will cause the material to distort and create the stress to alter the resonator frequency.

Figure 8:
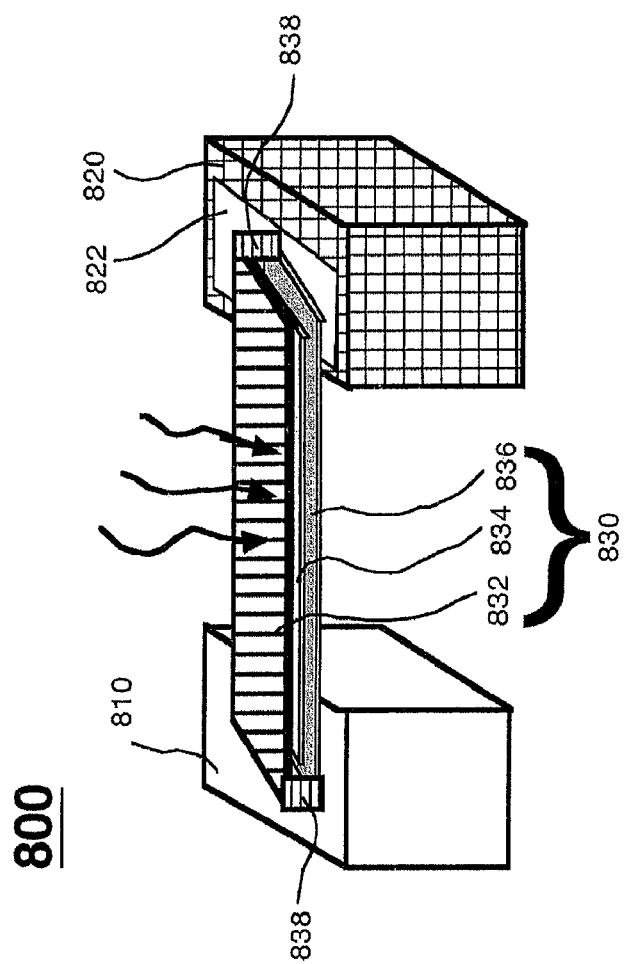
FIG. 8 is a perspective view of a detector according to another exemplary embodiment of the invention, which is based on a voltage induced distortion (VID) framework.

In particular, FIG. 8 is a perspective view of a visible/UV light detector (800) framework according to an exemplary embodiment of the invention, which is based on the VID concept. In general, the detector (800) comprises a substrate and digital logic circuitry (not specifically shown, but similar to all embodiments discussed above) and a bridge structure formed on the substrate 102. The bridge structure includes a first support member (810), a second support member (820) and a ribbon structure (830) suspended between the support members (810) and (820) above the substrate.

The support member (820) is a resonator member that operates at a resonant frequency and the support member (810) is a fixed insulating support structure. The ribbon structure (830) comprises photon sensitive layer (832), an insulating layer (834), a piezoelectric layer (836) and connecting members (838) that provide electrical connections between layers (832) and (836). The photon sensitive layer (832) is made from a photo-sensitive material that generates a voltage from exposure to incident photons (visible light or UV radiation). The voltage generated by layer (8320 is transferred to the piezoelectric layer (836) via connections (838), wherein the piezoelectric layer (836) reacts to the voltage by creating stress as it tries to change its length. This stress is transferred to the resonator (820), which causes it to change its resonant frequency in proportion to the amount of incident photon exposure. The digital logic circuit coupled to the resonator member (820) determines a change in frequency of the resonant frequency of the resonator member (820) due to force exerted on the resonator member (820) by the mechanical expansion and contraction of the piezo layer (836), wherein the change in frequency is correlated to an amount of incident photon energy received by the ribbon structure (830). This framework operates on a photovoltaic effect.

Figure 9:
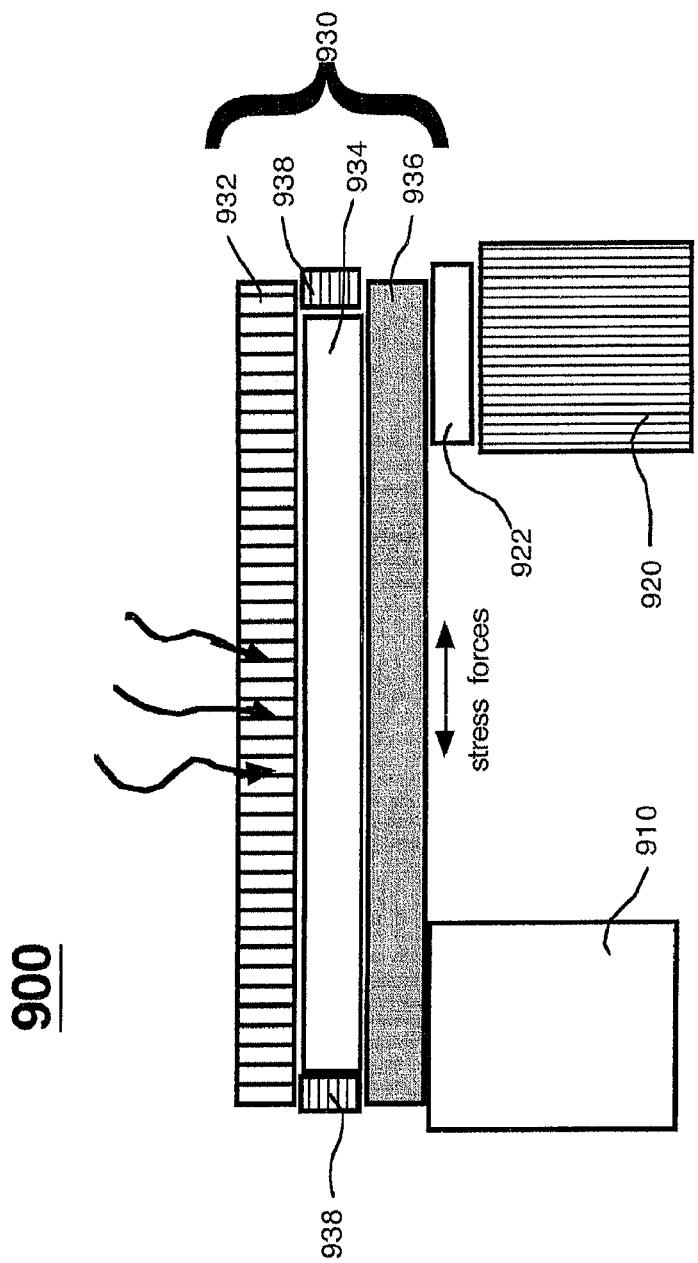
FIG. 9 is a side view of a detector according to another exemplary embodiment of the invention, which is based on a VID framework.

FIG. 9 is a perspective view of a detector (900) framework according to another exemplary embodiment of the invention, which is based on the VID concept. In general, the detector (900) comprises a substrate and digital logic circuitry (not specifically shown, but similar to all embodiments discussed above) and a bridge structure formed on the substrate. The bridge structure includes a first support member (910), a second support member (920) and a ribbon structure (930) suspended between the support members (910) and (920) above the substrate.

The support member (920) is a resonator member that operates at a resonant frequency and the support member (910) is a fixed insulating support structure. The ribbon structure (930) comprises an IR sensitive layer (932), an insulating layer (934), a piezoelectric layer (936) and connecting members (938) that provide electrical connections between layers (932) and (936). The IR sensitive layer (932) is made from a pyroelectric material that generates a voltage from exposure to incident IR radiation. The voltage generated by layer (932) is transferred to the piezoelectric layer (936) via connections (938), wherein the piezoelectric layer (936) reacts to the voltage by creating stress as it tries to change its length. This stress is transferred to the resonator (920), which causes it to change its resonant frequency in proportion to the amount of incident IR exposure. The digital logic circuit coupled to the resonator member (920) determines a change in the oscillating frequency of the resonator member (920) due to force exerted on the resonator member (920) by the mechanical expansion and contraction of the piezo layer (936), wherein the change in frequency is correlated to an amount of incident photon energy received by the ribbon structure (930). This framework operates on a pyroelectric effect to provide a detection structure for IR radiation.

Figure 10:
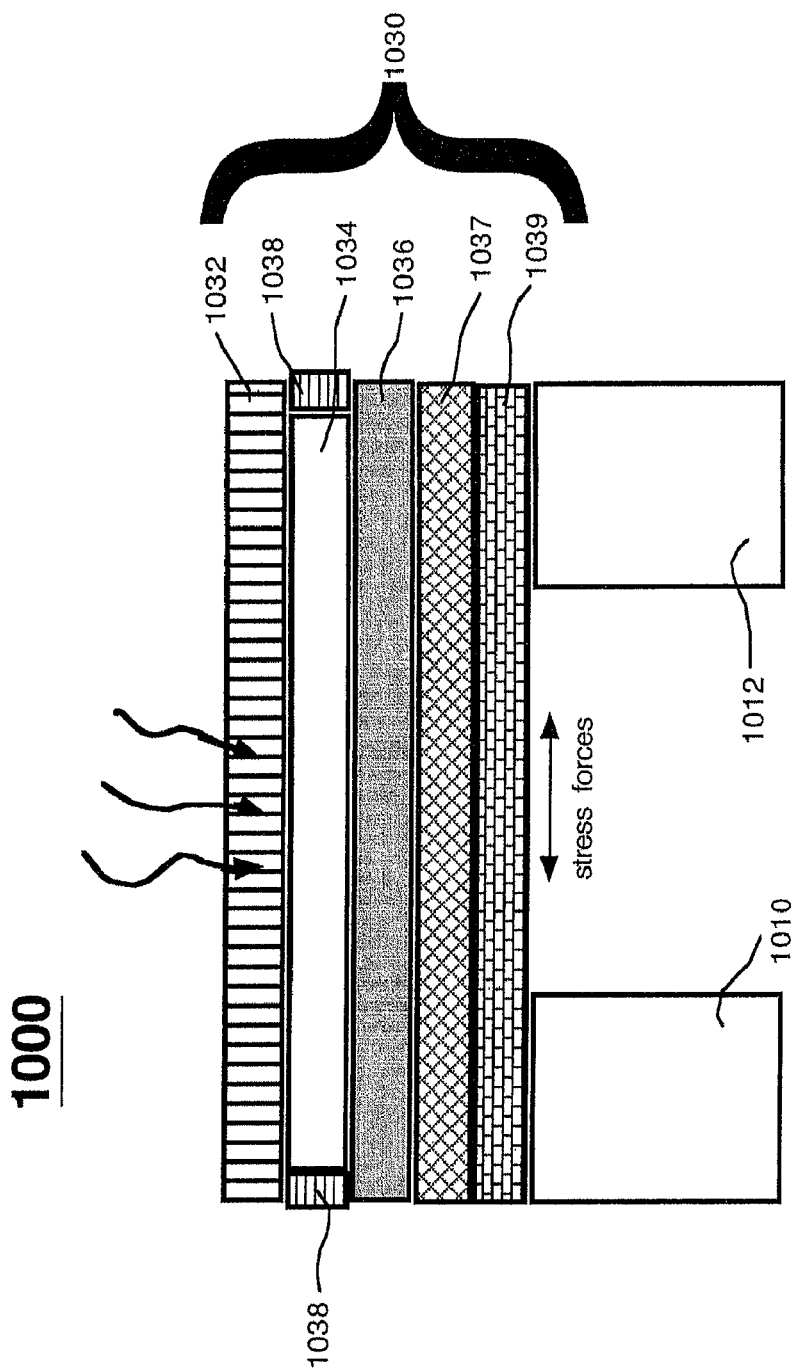
FIG. 10 is a side view of a detector according to another exemplary embodiment of the invention, which is based on a VID framework.

FIG. 10 is a perspective view of a detector (1000) framework according to another exemplary embodiment of the invention, which is based on the VID concept. In general, the detector (100) comprises a substrate and digital logic circuitry (not specifically shown, but similar to all embodiments discussed above) and a bridge structure formed on the substrate. The bridge structure includes a first support member (1010), a second support member (1012) and a ribbon structure (1030) suspended between the support members (1010) and (1012) above the substrate. The support members (1010) and (1012) are both insulating members.

In the exemplary embodiment of FIG. 10, the ribbon structure (1030) comprises an IR sensitive layer (1032) (pyroelectric layer), an insulating layer (1034), a piezoelectric layer (1036) connecting members (1038) that provide electrical connections between layers (1032) and (1036), a second insulating layer (1037) and a resonator member (1039). The IR sensitive layer (1032) is made from a pyroelectric material that generates a voltage from exposure to incident IR radiation. The voltage generated by layer (1032) is transferred to the piezoelectric layer (1036) via connections (1038), wherein the piezoelectric layer (1036) reacts to the voltage by creating stress as it tries to change its length. This stress is transferred to the resonator (1039), which is mechanically coupled to the piezoelectric layer (1036) via the second insulating layer (1037). The stress imparted on the resonator layer (1039) by the piezoelectric layer (1036) causes the resonator member (1039) to change its resonant frequency in proportion to the amount of incident IR exposure. The digital logic circuit coupled to the resonator member (1039) (via the support members (1010, 10120 determines a change in the oscillating frequency of the resonator member (1039) due to force exerted on the resonator member (1039) by the mechanical expansion and contraction of the piezo layer (1036), wherein the change in frequency is correlated to an amount of incident photon energy received by the ribbon structure (1030). This framework operates on a pyroelectric effect to provide a detection structure for IR radiation.

Figure 11:
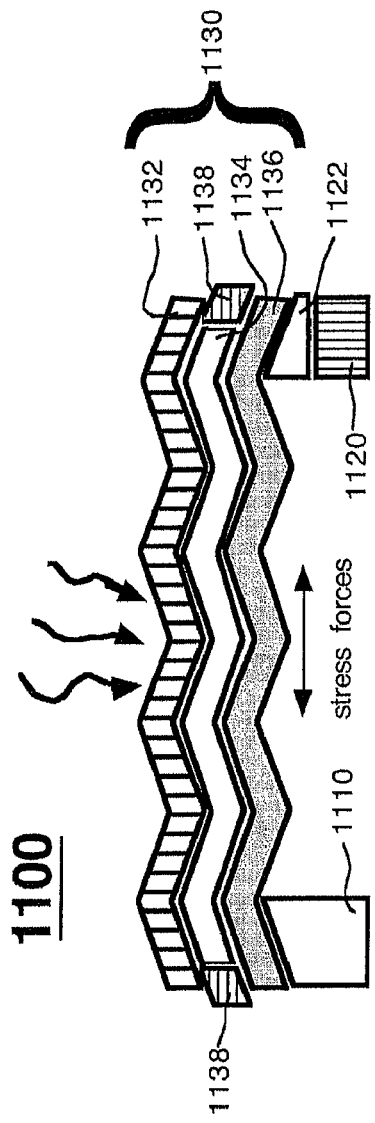
FIG. 11 is a side view of a detector according to another exemplary embodiment of the invention, which is based on a VID framework.

FIG. 11 is a perspective view of a detector (1100) framework according to another exemplary embodiment of the invention, which is based on the VID concept. In general, the detector (1100) comprises a substrate and digital logic circuitry (not specifically shown, but similar to all embodiments discussed above) and a bridge structure formed on the substrate. The bridge structure includes a first support member (1110), a second support member (1120) and a ribbon structure (1130) suspended between the support members (1110) and (1120) above the substrate. An insulating layer (1122) is interposed between the ribbon structure (1130) and the support member (1120).

The support member (1120) is a resonator member that operates at a resonant frequency and the support member (1110) is a fixed insulating support structure. The ribbon structure (1130) comprises an IR sensitive layer (1132), an insulating layer (1134), a piezoelectric layer (1136) and connecting members (1138) that provide electrical connections between layers (1132) and (1136). The IR sensitive layer (1132) is made from a pyroelectric material that generates a voltage from exposure to incident IR radiation. The voltage generated by layer (1132) is transferred to the piezoelectric layer (1136) via connections (1138), wherein the piezoelectric layer (1136) reacts to the voltage by creating stress as it tries to change its length. This stress is transferred to the resonator (1120), which causes it to change its resonant frequency in proportion to the amount of incident IR exposure.

The framework and operation of the detector of FIG. 11 is similar to that of FIG. 9, but where the ribbon structure (1130) of FIG. 11 is formed in an accordion or bellows shape. This shape increases the surface area exposed to the incident photons. The increased area allows for more heating in the thermal IR mode and to generate more voltage in the photoelectric mode, increasing the expansion characteristics.

Figure 12:
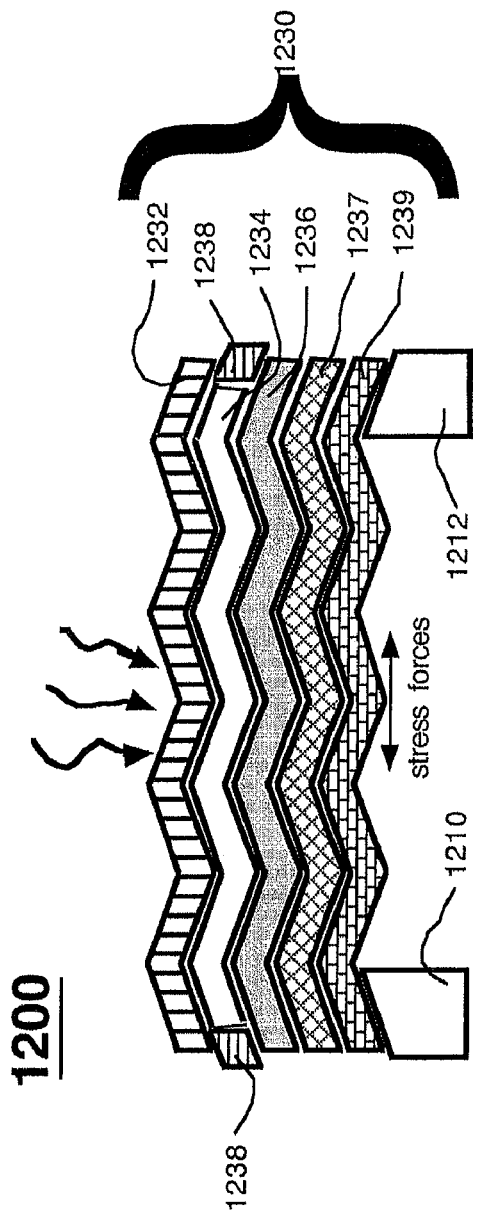
FIG. 12 is a side view of a detector according to another exemplary embodiment of the invention, which is based on a VID framework.

FIG. 12 is a perspective view of a detector (1200) framework according to another exemplary embodiment of the invention, which is based on the VID concept. In general, the detector (1200) comprises a substrate and digital logic circuitry (not specifically shown, but similar to all embodiments discussed above) and a bridge structure formed on the substrate. The bridge structure includes a first support member (1210), a second support member (1212) and a ribbon structure (1230) suspended between the support members (1210) and (1212) above the substrate. The support members (1210) and (1212) are both insulating members.

In the exemplary embodiment of FIG. 12, similar to the exemplary embodiment of FIG. 10, the ribbon structure (1230) comprises an IR sensitive layer (1232) (pyroelectric layer), an insulating layer (1234), a piezoelectric layer (1236) connecting members (1238) that provide electrical connections between layers (1232) and (1236), a second insulating layer (1237) and a resonator member (1239). The IR sensitive layer (1232) is made from a pyroelectric material that generates a voltage from exposure to incident IR radiation. The voltage generated by layer (1232) is transferred to the piezoelectric layer (1236) via connections (1238), wherein the piezoelectric layer (1236) reacts to the voltage by creating stress as it tries to change its length. This stress is transferred to the resonator (1239), which is mechanically coupled to the piezoelectric layer (1236) via the second insulating layer (1237). The stress imparted on the resonator layer (1239) by the piezoelectric layer (1236) causes the resonator member (1239) to change its resonant frequency in proportion to the amount of incident IR exposure.

The framework and operation of the detector structure of FIG. 12 is similar to that of FIG. 10, but where the ribbon structure (1230) of FIG. 12 is formed in an accordion or bellows shape. This shape increases the surface area exposed to the incident photons. The increased area allows for more heating in the thermal IR mode and to generate more voltage in the photoelectric mode, increasing the expansion characteristics.

Figure 13:
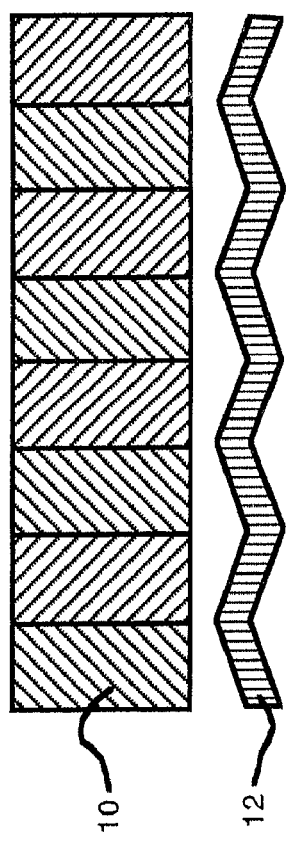
FIG. 13 schematically illustrates a top view and a side view of a bellows-shaped detector member, according to an exemplary embodiment of the invention.
Figure 14:
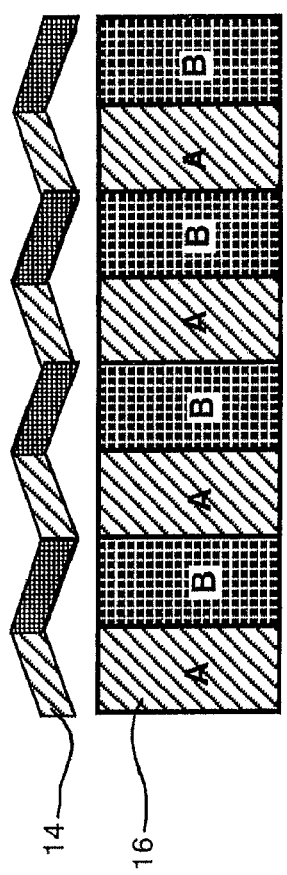
FIG. 14 schematically illustrates a top view and a side view of a bellows-shaped detector member that is formed of alternating materials that are different.

FIG. 13 schematically illustrates a top view (10) and a side view (12) of an accordion or bellows shaped ribbon structure, wherein the ribbon is made of a single material. FIG. 14 schematically illustrates a top view (16) and a side view (14) of an accordion or bellows shaped ribbon structure, wherein the ribbon is made of alternating materials A and B, which are different. The use of alternating materials on a photo sensitive/IR sensitive ribbon layer (e.g., layers 1132, 1232) can provide sensitivity with better linearity or wider or different spectral wavelengths. Moreover, the use of alternating materials on a resonator or piezo ribbon layer (e.g., layered 1136, 1236, 1239) allows for materials with different expansion coefficient characteristics to control detector response, improve stress linearity, resonator linearity, or allow for custom response characteristics.

Figures 15A, 15B:
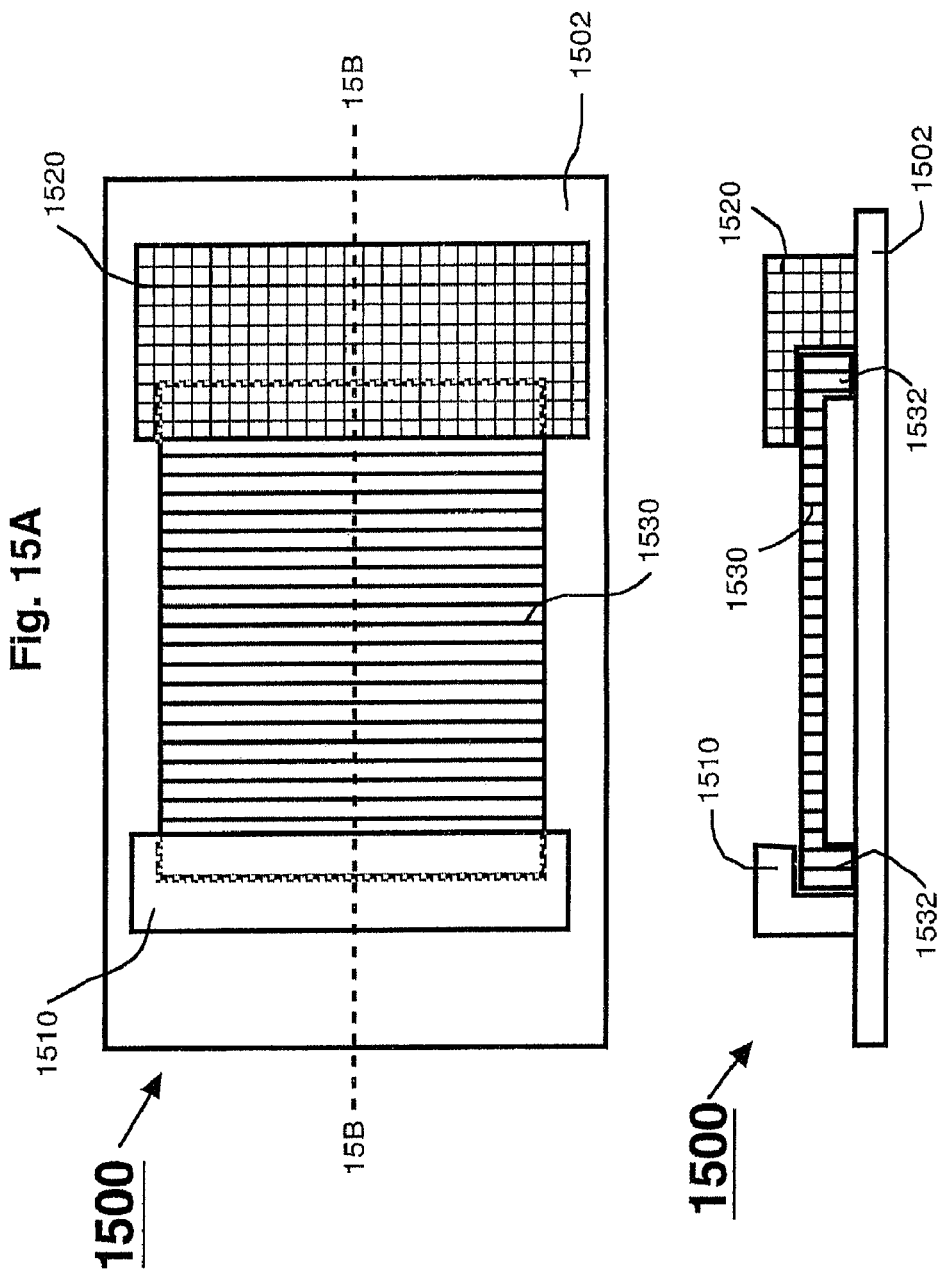

FIGS. 15A and 15B illustrate a photon detector (1500) according to another exemplary embodiment of the invention, which is based on a CTE framework. FIG. 15A is a top view of the photon detector (1500) and FIG. 15B is a cross-sectional view of the photon detector (1500) taken along line 15B-15B in FIG. 15A. In general, as shown in FIGS. 15A and 15B, the photon detector (1500) comprises a substrate (1502), a first support member (1510), a second support member (1520), fixedly connected to the substrate (1502), and a plate member (1530) disposed between the first and second support members (1510) and (1520). In the exemplary embodiment of FIG. 15, the first support member (1510) is a fixed insulating support structure and the second support member (1520) is a fixed resonator member that operates at a resonant frequency. The plate member (1530) is formed of one or more materials that are sensitive to IR energy, and having a thermal coefficient of expansion which causes the plate member (1530) to expand and contract by absorption of incident infrared energy to exert force on the resonator support member (1520).

As further shown in FIGS. 15A and 15B, the first and second support members (1510) and (1520) include grooves that insertably receive opposing ends of the plate member (1530). The end portions of the plate member (1530) comprise supporting leg elements (1532) which serve to maintain the IR absorbing portion of the plate member (1530) at some offset height from the surface of the substrate (1502). This allows the plate member (1530) to be substantially thermally insulated from the substrate (1502).

In one embodiment, the plate member (1530) is disposed between the first and second support members (1510) and (1520) in a "pre-stressed" state. In particular, in the "pre-stressed" state, the end portions of the plate member (1530) within the grooves of the first and second support members (1510) and (1520) exert some minimal force against the inner surfaces of the first and second support members (1510) and (1520) in the absence of any IR exposure. Indeed, pre-stressing the plate member (1530) between the first and second support members (1510) and (1520) serves many functions. For example, pre-stressing the end portions of the plate member (1530) against the inner side and top wall surfaces of the grooves prevents the plate member (1530) from moving out of position due to vibrations and camera movement. In addition, pre-stressing the plate member (1530) reduces or eliminates mechanical and vibration noise. Furthermore, pre-stressing the plate member (1530)

against the resonator member (1520) eliminates fluctuations in data measurement due to non-uniform stress distribution. Pre-stressing the plate member (1530) enables immediate readings of Δfo (change in oscillating frequency) of the resonator member (1520), which is cause by expansion of the plate member (1530) upon an increase in incident IR exposure on the plate member (1530).

In some embodiments, disposing the plate member (1530) between the first and second support members (1510) and (1520) in a "pre-stressed" state can be realized by dimensioning the various support and plate elements in a manner that the end portions of the plate member (1530) securely fit (wedged) within the grooves of the support members (1510) and (1520). In other embodiments, a filler material may be used to fill any small gaps or spaces between the end portions of the plate member (1530) and the inner side and top wall surfaces of the grooves of the first and second support members (1510) and (1520). The filler material can be any suitable material that will not cause the end portions of the plate member (1530) to adhere to the substrate (1502) or the first and second support members (1510) and (1520), and which does not deteriorate due to thermal and mechanical conditions over repeated use and operation of the detector (1500). For example, Teflon is one suitable material that can be used for this purpose.

As in other embodiments, a digital logic circuit (not specifically shown) is coupled to the resonator member (1520) for determining a change in the oscillating frequency of the resonator member (1520) due to force exerted on the resonator member (1520) by the thermal expansion and contraction of the plate member (1530), wherein the change in frequency is correlated to an amount of incident infrared energy absorbed by the plate member (1530).

It is to be understood that the specifications and material used for constructing a detector (pixel) such as shown in FIGS. 15A/15B can vary depending on the application. For example, the substrate (1502) can be made of materials such as silicon, glass, ceramic, etc. The size of each detector (pixel) can be about 40 um×45 μm, with a pixel pitch of about 50 μm. The plate member (1530) can be made of materials or layers of different materials providing sufficient thermal expansion and thermal conductivity, such as Zn, Au, SiC (silicon carbide), ZnS (zinc selenide), BN (boron nitride), ZnO (zinc oxide), or Si3N4 (silicon nitride), etc. The thermally conductive plate materials can be fabricated to facilitate a larger direction of thermal conductivity in a direction beneficial to the design, wherein the larger conductivity direction is parallel to the direction of the grain created by the fabrication. In other words, in the exemplary embodiment of FIGS. 15A and 15B, the stress direction of the plate member (1530) can be in a direction along the substrate between the first and second support members (1510) and (1520) as determined by the grain structure of the plate member (1530) created during fabrication.

In other embodiments, the plate member (1530) can be coated with any suitable materials such as DLC, SiC, CaF2, etc., to enhance thermal IR absorption in the 4 μm and 10 μm spectrum, for example. These coating materials should have sufficient expansion and adhesive properties to prevent delamination over time. The resonator member (1520) may be made of materials such as Lead Zirconate Titanate (PZT), Lead Scandium Tantalate, Barium Strontium Titanate, Bismuth Sodium Titanate (BNT), Barium Titanate (MHz range). The thermal and stress reaction time constants of the plate member (1530) should be made fast enough for standard or faster video frame rates. For instance, a rise and fall cycle time of <2 ms would be sufficient for frame rates of 30 frames per second.

FIGS. 16A and 16B illustrate a photon detector according to another exemplary embodiment of the invention, which is based on a CTE framework. FIG. 16A is a cross-sectional view of the photon detector (1600) taken along line 16A-16A in FIG. 16B, and FIG. 16B is a top view of the photon detector (1600). In general, as shown in FIGS. 16A and 16B, the photon detector (1600) comprises a substrate (1602), a first support member (1610), a second support member (1620), a plate member (1630), and a resonator member (1640). The plate member (1630) is disposed between the first support member (1610) and the resonator member (1640). The first and second support members (1610) and (1620) are fixed insulating support structures. The resonator member (1640) operates at a resonant frequency. The plate member (1630) is formed of one or more materials that are sensitive to IR energy, and having a thermal coefficient of expansion which causes the plate member (1630) to expand and contract by absorption of incident infrared energy to exert force on the resonator member (1640).

As further shown in FIGS. 16A and 16B, the first support member (1610) comprises a slot (1612) formed in a sidewall thereof. The second support member (1620) is formed of two separate support elements, including a first lower support element (1622) and a second upper support element (1624), which are fixedly disposed adjacent to, and in contact with, a sidewall of the resonator member (1640). The lower and upper support elements (1622) and (1624) are spaced apart to form a slot region (1626) there between. The plate member (1630) has one end inserted in the slot (1612) of the first support member (1610) and another end inserted in the slot (1626) formed by the lower and upper support elements (1622) and (1624). The first and second support members (1610) and (1620) maintain the plate member (1630) at some offset height from the surface of the substrate (1602), such that the plate member (1630) is completely thermally insulated from the substrate (1602).

As in other embodiments discussed herein, a digital logic circuit (not specifically shown) is coupled to the resonator member (1640) for determining a change in the oscillating frequency of the resonator member (1640) due to force exerted on the resonator member (1640) by the thermal expansion and contraction of the plate member (1630), wherein the change in frequency is correlated to an amount of incident infrared energy absorbed by the plate member (1630).

Furthermore, it is to be understood that the specifications and materials that may be used for constructing a detector (pixel) such as shown in FIGS. 16A/16B can be those discussed above with reference to FIGS. 15A/15B. Moreover, in some embodiments, the plate member (1630) can be disposed between the first support member (1610) and the resonator member (1640) in a "pre-stressed" state, for reasons discussed above. The various structures can be dimensioned such that the end portions of the plate member (1630) are securely fit (wedged) within the slots (1612) and (1626). In other embodiments, a filler material may be used to fill any small gaps or spaces between the end portions of the plate member (1630) and the inner surfaces of the slots (1612) and (1626) and the sidewall of the resonator member (1640).

FIGS. 17A and 17B illustrate a photon detector (1700) according to another exemplary embodiment of the invention, which is based on a CTE framework. FIG. 17A is a cross-sectional view of the photon detector (1700) taken along line 17A-17A in FIG. 17B, and FIG. 17B is a top view of the photon detector (1700) taken along line 17B-17B in FIG. 17A. In general, as shown in FIGS. 17A and 17B, the photon detector (1700) comprises a substrate (1702), a first support member (1710), a second support member (1720) disposed the substrate (1702), and a plate member (1730). In this exemplary embodiment, the second support member (1720) is a rectangular-shaped resonator member having a cavity region (1722) formed in one surface thereof. An optional thin thermal insulating layer (not shown) may be disposed between the bottom surface of the resonator member (1720) and the surface of the substrate (1702).

The plate member (1730) is disposed within the cavity region (1722) of the resonator member (1720). The plate member (1730) is secured in place in the cavity region (1722) by the first support member (1710). The first support member (1710) may be a continuous rectangular frame structure that is fixedly secured to the top surface of the resonator member (1720), wherein a portion of the first support member (1710) overlaps the inner sidewalls of the cavity region (1722) to provide a lip that covers the upper peripheral surface edge of the plate member (1730), while leaving a large surface area for the plate member (1730) to absorb incident IR energy. In other embodiments, the first support member (1710) may comprise a plurality of separate elements that are disposed in certain regions around the perimeter of the cavity region (1722) (e.g., each sidewall corner, or at a midpoint along each sidewall, etc.) sufficient to maintain the plate member (1730) within the cavity region (1722).

In some embodiments, the plate member (1730) can be disposed within the cavity (1722) of the resonator member (1720) in a "pre-stressed" state, for reasons discussed above. The resonator member (1720) operates at a resonant frequency. The plate member (1730) is formed of one or more materials that are sensitive to IR energy, and having a thermal coefficient of expansion which causes the plate member (1730) to expand and contract by absorption of incident infrared energy to exert force on the resonator member (1720). In the exemplary embodiment of FIGS. 17A/17B, as the plate member (1730) expands in response to heating caused by absorption of incident infrared energy, the plate member (1730) exerts a force on the resonator member (1720) in three dimensions. In particular as shown in FIG. 17B, the plate member (1730) exerts a first horizontal force (Fx) in the x-direction on a first pair of opposing inner sidewalls of the cavity region (1720) of the resonator member (1720), and a second horizontal force (Fy) in the y-direction on a second pair of opposing inner sidewalls of the cavity region (1722) of the resonator member (1720).

Moreover, as shown in FIG. 17A, the plate member (1730) exerts a vertical force (Fz) against a bottom surface of the cavity region (1722) of the resonator member (1720) as the plate member (1730) expands in the z-direction between the overlapping lip portion of the first support member (1710) and the bottom surface of the cavity region (1722). Moreover, a vertical force Fz exerted against the bottom surface of the first support member elements (1710) will translate a vertical force to the top surface of the resonator member (1720) along the sidewalls (which define the cavity region (1722)).

As in other embodiments discussed herein, a digital logic circuit (not specifically shown) is coupled to the resonator member (1720) for determining a change in frequency of the resonant frequency of the resonator member (1720) due to force exerted on the resonator member (172) by the thermal expansion and contraction of the plate member (1720), wherein the change in frequency is correlated to an amount of incident infrared energy absorbed by the plate member (1630). With the exemplary embodiment of FIGS. 17A/17B, the sensitivity of the detector is increased as the change in frequency of the resonant frequency of the resonator member (1720) is due to stresses applied to the resonator member (1720) in three (x-y-z) dimensions.

Figure 18:
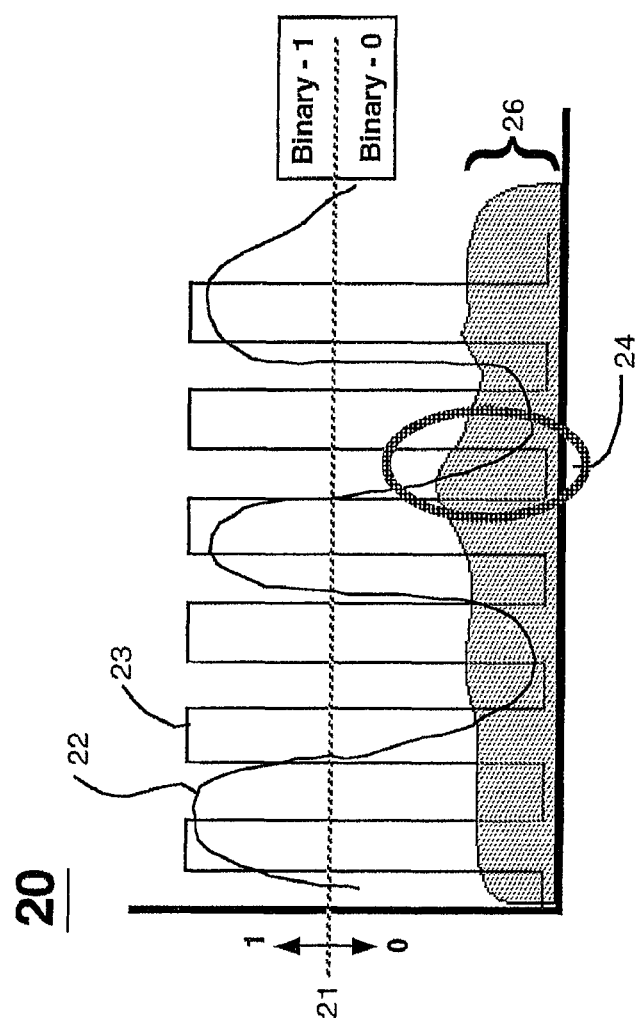
FIG. 18 graphically illustrates an advantage of using a direct-to-digital passive detector framework over conventional analog signal detector or quantum electronic designs, according to exemplary embodiments of the invention.

In all exemplary embodiments discussed above, the detector framework is passive, i.e., the detector elements (e.g., CTE ribbons, CTE plates) are not part of the active electrical circuit. When a device uses active powered circuitry it is susceptible to electrical noise. This concept will be illustrated with reference to FIG. 18. FIG. 18 is a graphical illustration (20) showing an advantage of using a direct-to-digital passive detector frameworks over conventional analog signal detector or quantum electronic designs, according to exemplary embodiments of the invention. FIG. 18 illustrates electrical noise (26) that can mask or interfere with an analog signal (22) containing desired sensor data, which is lost in noise (24). In order for the signal data to be detected, it must be greater than noise level (or 'noise floor') (26). Any portion of the analog signal (24) below the 'noise floor' (26) is lost information. The noise limits the sensitivity of the sensor system to the level of the noise floor. Some systems go to great lengths to reduce the noise level to acquire better sensitivity. An example is cryogenic cooling. Although it achieves good sensitivity, it is complex, costly, cumbersome and dangerous.

One advantage of digital electronics is that data can be transmitted with the greatest amount of immunity to noise as possible. An analog signal (22) as shown in FIG. 18 is susceptible to noise because small changes in the signal data may be smaller in amplitude than the systems noise level or noise floor, which masks that part of the analog signal (so it is lost). This is a major limiting factor to any systems overall sensitivity and performance. In FIG. 18, the analog signal (22) can be converted to a series of binary numbers (logic 1 and logic 0). These binary numbers are represented by square waves (23) that modulate between the systems voltage low point and high point. To be detected, the square waves need only switch above or below the system transition level (21) to be valid data. Digital design enable acquisition of valid data by using the leading or falling edge of the square wave signal. This trigger point is discernible even in high noise environments. So it is a clear advantage to have the systems data be digital at the earliest possible time in the data creation scheme. In the exemplary detector schemes discussed herein, a passive detector member is implemented, as it is more noise immune than active circuitry.

Figure 19:
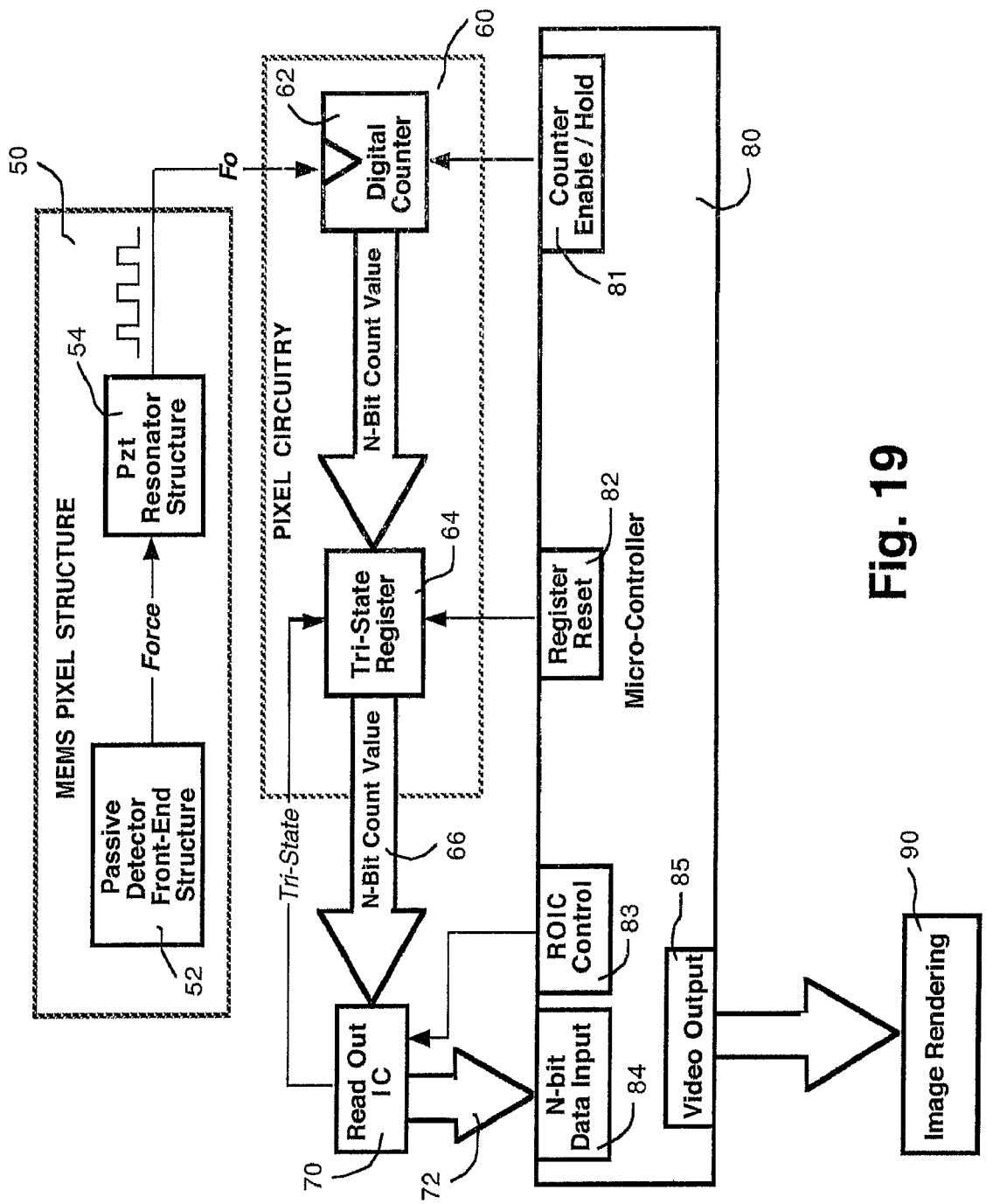
FIG. 19 is a block diagram of an imager system based on passive detectors, according to an exemplary embodiment of the invention.

FIG. 19 is a block diagram of an imager system implementing passive detectors, according to an exemplary embodiment of the invention. In general, FIG. 19 shows an imager circuit comprising a pixel structure (50), pixel circuitry (60), a read out integrated circuit (70) ("ROIC"), a controller (80), and an image rendering system (90). The pixel (50) comprises a passive detector front-end structure (52) and a resonator structure (54). The pixel circuitry (60) comprises a digital counter (62) and a tri-state register (64). The controller (80) comprises a counter enable/hold control block (81), a register reset block (82), an ROIC control block (83), a data input control block (84), and a video output control block (85).

In the pixel structure (50) of FIG. 19, the passive detector front-end structure (52) generically represents any one of the passive pixel detector structures discussed herein, including the support structures and detector elements (e.g., CTE ribbons, plates structures, etc.) that are designed to be mechanically distorted in response to photon exposure, for example, and apply mechanical stress (force) to the resonator structure (54). The detector front-end structure (54) is electrically passive and has no noise generating electronics.

The resonator structure (54) oscillates at a resonant frequency $F_o$ and outputs a square wave signal. The resonator structure (54) is designed to have a reference (or base) resonant frequency (no photon exposure) in a state in which no additional stress, other than the pre-stress amount, is applied to the resonator structure (54) by the detector front-end (52) due to photon exposure. As mechanical stress is applied to the resonator member (54) from the detector front-end (52) due to photon exposure, the oscillating frequency of the resonator member (54) will increase from its reference (base) resonant frequency. In one exemplary embodiment, the digital circuits (60), (70) and (80) collectively operate to determine the output frequency $F_o$ of the resonator member (54) due to the force exerted on the resonator member (54) by the expansion and contraction of a passive detector element (e.g., ribbon, plate) of the detector front end structure (52), determine an amount of incident photonic energy absorbed by the passive detector element based on the determined resonant frequency $F_o$ of the resonator member (54) at a given time, and generate image data based on the determined amount of incident photonic energy at the given time, which is then rendered by the imaging system (90).

In particular, the output signal generated by the resonator member (54) is a digital square wave signal having a frequency $F_o$ that varies depending on the stress applied to the resonator member (54) by the passive detector front-end structure (52). The output signal generated by the resonator member (54) is input to a clock input port of the digital counter (62). For each read cycle (or frame) of the imager, the digital counter (62) counts the pulses of the output signal from the resonator member (54) for a given "counting period" (or reference period) of the read cycle. The counting operation of the digital counter (62) is controlled by a CLK enable signal generated by the counter control block (81) of the controller (80). For each read cycle, the count information generated by the counter (62) is output as an n-bit count value to the tri-state register (64).

The ROIC 70 reads out the count value (pixel data) from the pixel circuitry (60) of a given pixel (50) for each read cycle. It is to be understood that for ease of illustration, FIG. 19 shows one pixel unit (50) and one corresponding pixel circuit (60), but an imager can have a plurality of pixel units (50) and corresponding pixel circuits (60) forming a linear pixel array or a 2D focal plane pixel array, for example. In this regard, the ROIC (70) is connected to each pixel circuit (60) over a shared n-bit data bus (66), for controllably transferring the individual pixel data from the each pixel counting circuit (60) (which is preferably formed in the active silicon substrate surface under each corresponding pixel structure (50)) to the controller (80).

In particular, in response to control signals received from the ROIC control block (83) of the controller (80), the ROIC (70) will output a tri-state control signal to the pixel circuitry (60) of a given pixel (50) to read out the stored count data in the shift-register (64) onto the shared data bus (66). The shift-register (64) of each pixel circuit (60) is individually controlled by the ROIC (70) to obtain the count data for each pixel at a time over the data bus (66). The count data is transferred from the ROIC (70) to the controller (80) over a dedicated data bus (72) connected to the n-bit data input control block (84) of the controller (80). After each read cycle, the tri-state register (64) of each pixel will be reset via a control signal output from the register reset control block (82) of the controller (80).

The controller (80) processes the count data obtained from each pixel in each read cycle (or video frame) to determine the amount of incident photon exposure for each pixel and uses the determined exposure data to create a video image. The video data is output to an image rendering system (90) via the video output block (85) to display an image. In some embodiments of the invention where the counter (62) for a given pixel (50) obtains count data for the given pixel (50) by directly counting the output frequency generated by the resonator member (54), the controller (80) will use the count data to determine a grayscale level for the pixel, which corresponds to the amount of the incident photonic exposure of the pixel. For example, in some embodiments, the grayscale level can be determined using a grayscale algorithm or using a lookup table in which the different grayscale values (over a range from black to white) are correlated with a range of count values for a priori determined increments of changes in the oscillating frequency of the resonator member from the base reference frequency to a maximum oscillating frequency. The maximum oscillating frequency is the highest frequency that can output from the resonator member in response to the maximum amount of stress force that can be created by the given passive detector front-end structure.

Figure 20:
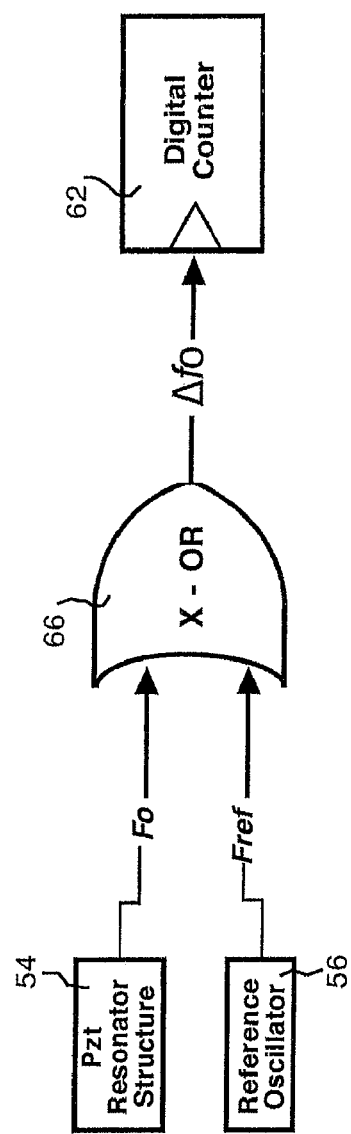
FIG. 20 is a block diagram that illustrates another exemplary embodiment of a pixel unit and pixel circuitry, which can be implemented in the imager system of FIG. 19.

In other embodiments of the invention, the pixel structure and pixel circuitry of FIG. 19 can be modified such that the counter will count the frequency of a signal that represents the difference between the base resonant frequency of the resonator member (54) and the actual output frequency generated by the resonator member (54) at a given time in response to stress applied by the passive detector front-end (52). For example, FIG. 20 illustrates another exemplary embodiment of a pixel unit and pixel circuitry that can be implemented in the imager system of FIG. 19. In FIG. 20, the pixel (50) (of FIG. 19) is modified to include a reference oscillator (56) that outputs a reference resonant frequency $F_{ref}$. The pixel circuitry (60) (of FIG. 19) is modified to include an exclusive-Or gate (66) that receives as input, the output signal of the resonator member (54) (having a variable frequency Fo) and the fixed signal from the reference oscillator (56). The X-Or gate (66) operates to remove the base frequency component of the signal $F_o$ output from the resonator member (54) based on the reference frequency of the reference oscillator (56) and outputs a square wave signal having a frequency equal to the change $\Delta F_o$ in frequency of resonator member (54). The $\Delta F_o$ frequency signal, which is much lower in frequency than the oscillating frequency Fo of the resonator member (54), requires a lower bit number counter (62) to count the $\Delta F_o$ signal, making it simpler to implement. As with the embodiments of FIG. 19, the $\Delta F_o$ signal is counted for a reference period and the count value is used to determine incident photon exposure of the pixel, as discussed above.

Although exemplary embodiments have been described herein with reference to the accompanying drawings for purposes of illustration, it is to be understood that the present invention is not limited to those precise embodiments, and that various other changes and modifications may be affected herein by one skilled in the art without departing from the scope of the invention.

What is claimed is:

1. A device, comprising:
   a substrate;

a photon detector formed on the substrate, wherein the photon detector comprises:
  a piezoelectric resonator configured to generate an output signal having a frequency or period of oscillation;
  an unpowered detector, wherein the unpowered detector is configured for photon exposure, wherein the unpowered detector comprises a material having a thermal coefficient of expansion that causes the unpowered detector to distort due to said photon exposure, wherein the unpowered detector is further configured to apply a mechanical force to the piezoelectric resonator due to said distortion of the unpowered detector, and cause a change in the frequency or period of oscillation of the output signal generated by the piezoelectric resonator due to said mechanical force applied to the piezoelectric resonator; and
  digital circuitry configured to (i) determine the frequency or period of oscillation of the output signal generated by the piezoelectric resonator as a result of the mechanical force applied to the piezoelectric resonator by the unpowered detector, and to (ii) determine an amount of said photon exposure based on the determined frequency or period of oscillation of the output signal generated by the piezoelectric resonator.

2. The device of claim 1, wherein the photon detector is configured to detect thermal infrared energy having a wavelength in a range of about 2 micrometers to 25 micrometers.

3. The device of claim 1, wherein the photon detector further comprises a first support, wherein the unpowered detector comprises a ribbon, and wherein the ribbon is suspended above said substrate and supported by the first support and the piezoelectric resonator, wherein the ribbon comprises a material having a thermal coefficient of expansion, which causes the ribbon to distort due to said photon exposure and apply said mechanical force to the piezoelectric resonator.

4. The device of claim 3, wherein the first support is comprises a fixed insulating support.

5. The device of claim 3, wherein the photon detector further comprises a reflector disposed on the substrate beneath the ribbon.

6. The device of claim 1, wherein the photon detector further comprises a first support, wherein the unpowered detector comprises a plate, and wherein the plate is disposed between the first support and the piezoelectric resonator, wherein the plate comprises a material having a thermal coefficient of expansion, which causes the plate to distort due to said photon exposure and apply said mechanical force to the piezoelectric resonator.

7. The device of claim 6, wherein the first support has a first groove and wherein the piezoelectric resonator comprises a second groove, wherein ends of the plate are disposed within the first and second grooves.

8. The device of claim 6, wherein the photon detector further comprises a second support, disposed adjacent the piezoelectric resonator, wherein the first support has a first groove and wherein the second support comprises a second groove, wherein ends of the plate are disposed within the first and second grooves, wherein the second groove allows the plate to apply said mechanical force to the piezoelectric resonator as the plate distorts due to said photon exposure.

9. The device of claim 6, wherein the plate is disposed between the first support and the piezoelectric resonator in a pre-stressed state.

10. The device of claim 1, wherein the piezoelectric resonator comprises a recessed cavity region formed in a surface of the piezoelectric resonator, wherein the unpowered detector comprises a plate that is disposed within the recessed cavity region of the piezoelectric resonator, wherein the photon detector further comprises a first support that is disposed on the surface of the piezoelectric resonator and overlapping at least a portion of the recessed cavity region to secure the plate within the cavity region, and wherein the plate comprises a material having a thermal coefficient of expansion, which causes the plate to distort due to said photon exposure and apply said mechanical force to the piezoelectric resonator.

11. The device of claim 10, wherein the first support comprises a continuous frame structure that is fixedly secured to the surface of the piezoelectric resonator, wherein a portion of the first support overlaps the inner sidewalls of the cavity region to provide a lip that covers the upper peripheral surface edge of the plate, while leaving an open surface area for the plate for said photon exposure.

12. The device of claim 10, wherein distortion of the plate causes said mechanical force to be applied to the piezoelectric resonator in three dimensions.

13. The device of claim 10, wherein the plate is disposed within the recessed cavity of the piezoelectric resonator in a pre-stressed state.

14. A thermal imaging system comprising the device of claim 1.

15. A method, comprising:
  exposing a photon detector to incident photons, wherein the photon detector comprises an unpowered detector, and a piezoelectric resonator, wherein the piezoelectric resonator is configured to generate an output signal having a frequency or period of oscillation;
  distorting the unpowered detector due to said photon exposure, wherein the unpowered detector comprises a material having a thermal coefficient of expansion that causes the unpowered detector to distort due to said photon exposure;
  applying a mechanical force to the piezoelectric resonator due to the distorting of the unpowered detector;
  determining a frequency or period of oscillation of the output signal generated by the piezoelectric resonator as a result of the mechanical force applied to the piezoelectric resonator by the unpowered detector; and
  determining an amount of said photon exposure of said photon detector based on said determined frequency or period of oscillation of the output signal generated by the piezoelectric resonator.

16. The method of claim 15, further comprising generating image data using the determined frequency.

17. The method of claim 15, wherein determining an amount of said photon exposure comprises:
  generating count data by counting a number of digital pulses in the output signal generated by the piezoelectric resonator for a given counting period; and
  determining a level of photon exposure based on said count data.

18. A device, comprising:
  a substrate;
  a photon detector formed on the substrate, wherein the photon detector comprises:
    a first electrode and a second electrode;
    a piezoelectric resonator configured to generate an output signal having a frequency or period of oscillation, wherein the piezoelectric resonator is connected to the first and second electrodes and suspended above a surface of the substrate, wherein the first and second electrodes apply a drive voltage to the piezoelectric resonator;

an unpowered detector, wherein the unpowered detector is mechanically coupled to the piezoelectric resonator, wherein the unpowered detector is configured for photon exposure, wherein the unpowered detector comprises a material having a thermal coefficient of expansion that causes the unpowered detector to distort due to said photon exposure, wherein the unpowered detector is further configured to apply a mechanical force to the piezoelectric resonator due to said distortion of the unpowered detector, and cause a change in the frequency or period of oscillation of the output signal generated by the piezoelectric resonator due to said mechanical force applied to the piezoelectric resonator; and digital circuitry configured to (i) determine the frequency or period of oscillation of the output signal generated by the piezoelectric resonator as a result of the mechanical force applied to the piezoelectric resonator by the unpowered detector, and to (ii) determine an amount of said photon exposure based on the determined frequency or period of oscillation of the output signal generated by the piezoelectric resonator.

19. The device of claim 18, wherein the photon detector further comprises a fixed support connected to the substrate, wherein end portions of the unpowered detector are mechanically coupled to the fixed support and the piezoelectric resonator.

\* \* \* \* \*